US012254771B2

(12) United States Patent
Beaurepaire

(10) Patent No.: US 12,254,771 B2
(45) Date of Patent: Mar. 18, 2025

(54) METHOD AND APPARATUS FOR PLACING A SHARED MICRO-MOBILITY VEHICLE IN PUBLIC SPACES

(71) Applicant: HERE Global B.V., Eindhoven (NL)

(72) Inventor: Jerome Beaurepaire, Nantes (FR)

(73) Assignee: HERE Global B.V., Eindhoven (NL)

( * ) Notice: Subject to any disclaimer, the term of this patent is extended or adjusted under 35 U.S.C. 154(b) by 246 days.

(21) Appl. No.: 17/752,487

(22) Filed: May 24, 2022

(65) Prior Publication Data

US 2023/0386335 A1 Nov. 30, 2023

(51) Int. Cl.
*G08G 1/14* (2006.01)
*G01S 17/89* (2020.01)
*G08G 1/065* (2006.01)

(52) U.S. Cl.
CPC ............. *G08G 1/144* (2013.01); *G01S 17/89* (2013.01); *G08G 1/065* (2013.01); *G08G 1/146* (2013.01); *G08G 1/147* (2013.01)

(58) Field of Classification Search
CPC ........ G08G 1/144; G08G 1/065; G08G 1/146; G08G 1/147; G01S 17/89
See application file for complete search history.

(56) References Cited

U.S. PATENT DOCUMENTS

| | | | | |
|---|---|---|---|---|
| 9,965,936 | B1 * | 5/2018 | Epps ..................... | G08B 21/02 |
| 10,176,718 | B1 * | 1/2019 | Mazuir .................. | G08G 1/205 |
| 10,515,549 | B1 * | 12/2019 | Luomi ................... | G06Q 50/40 |
| 10,629,078 | B1 | 4/2020 | Levy et al. | |
| 11,025,865 | B1 * | 6/2021 | Medasani ............. | H04N 7/181 |
| 11,062,602 | B1 | 7/2021 | Beaurepaire et al. | |
| 11,783,574 | B2 * | 10/2023 | Tan ....................... | G08G 1/0175 |
| | | | | 340/932.2 |
| 2006/0259978 | A1 * | 11/2006 | Pikus .................... | H04L 9/0844 |
| | | | | 713/189 |
| 2009/0119167 | A1 * | 5/2009 | Kendall ............. | G06Q 30/0255 |
| | | | | 705/14.17 |

(Continued)

FOREIGN PATENT DOCUMENTS

CN 109559501 A 4/2019

*Primary Examiner* — Steven Lim
*Assistant Examiner* — Son M Tang
(74) *Attorney, Agent, or Firm* — DITTHAVONG, STEINER & MLOTKOWSKI

(57) ABSTRACT

An approach is provided for determining placement location(s) in a public space for a shared micro-mobility vehicle. The approach involves identifying a candidate placement location in the sidewalk area. The approach also involves determining factor(s) associated with the location and/or nearby location(s) in the sidewalk area. The approach further involves making a determination of whether the location is suitable for temporary placement of a shared micro-mobility vehicle based on whether the location enables: (i) avoiding interference between the vehicle and a current/predicted people flow, a bicycle lane, and/or one or more objects, (ii) preventing the vehicle from hindering usage of a point of interest, a vehicle parking area, and/or a transit station, or (iii) accommodating the vehicle to a sidewalk configuration. The approach further involves based on the determination, outputting an indication of whether the location is suitable for temporary placement of the vehicle.

20 Claims, 18 Drawing Sheets

(56) References Cited

U.S. PATENT DOCUMENTS

| | | | |
|---|---|---|---|
| 2010/0332305 A1* | 12/2010 | Higgins | G06Q 30/0214 |
| | | | 705/14.44 |
| 2013/0189939 A1* | 7/2013 | Wang | H04W 64/00 |
| | | | 455/127.1 |
| 2014/0132767 A1 | 5/2014 | Sonnabend et al. | |
| 2014/0256356 A1* | 9/2014 | Shen | G01S 5/14 |
| | | | 455/456.6 |
| 2015/0148056 A1* | 5/2015 | Austin | H04W 64/00 |
| | | | 455/456.1 |
| 2015/0169630 A1* | 6/2015 | Shynar | G06F 16/9537 |
| | | | 707/769 |
| 2015/0285639 A1* | 10/2015 | Basalamah | H04W 4/027 |
| | | | 455/456.3 |
| 2016/0180712 A1* | 6/2016 | Rosen | G08G 1/147 |
| | | | 705/5 |
| 2016/0358474 A1* | 12/2016 | Uppal | G06V 20/20 |
| 2016/0371607 A1* | 12/2016 | Rosen | G08G 1/141 |
| 2017/0098373 A1* | 4/2017 | Filley | H04W 4/90 |
| 2017/0267233 A1 | 9/2017 | Minster et al. | |
| 2017/0372593 A1* | 12/2017 | Chadwick | G08B 25/14 |
| 2018/0052860 A1* | 2/2018 | Hayes | G06Q 50/40 |
| 2018/0082585 A1* | 3/2018 | Zhang | G08G 1/096883 |
| 2018/0328753 A1* | 11/2018 | Stenning | G01C 21/08 |
| 2019/0009713 A1* | 1/2019 | Pal | G08G 1/149 |
| 2019/0042918 A1* | 2/2019 | Meyer | G06N 3/045 |
| 2019/0228648 A1 | 7/2019 | Moustafa et al. | |
| 2019/0391588 A1* | 12/2019 | Fujimura | G05D 1/0088 |
| 2020/0042803 A1* | 2/2020 | Yamaguchi | G06V 20/56 |
| 2020/0202386 A1* | 6/2020 | Fowe | H04W 4/23 |
| 2020/0209370 A1 | 7/2020 | Zhang et al. | |
| 2020/0240808 A1* | 7/2020 | Beaurepaire | G01C 21/3461 |
| 2020/0309557 A1* | 10/2020 | Efland | G06V 20/20 |
| 2020/0380798 A1* | 12/2020 | Frankel | G08G 1/20 |
| 2020/0400446 A1* | 12/2020 | Beaurepaire | G08G 1/144 |
| 2020/0410259 A1* | 12/2020 | Srinivasan | G06F 17/18 |
| 2021/0027487 A1* | 1/2021 | Lawlor | G01C 11/34 |
| 2021/0061306 A1 | 3/2021 | Dagan et al. | |
| 2021/0233198 A1* | 7/2021 | Wells | H04L 67/306 |
| 2021/0272459 A1* | 9/2021 | Tan | G08G 1/142 |
| 2022/0254161 A1* | 8/2022 | Tatrai | G06T 7/70 |

* cited by examiner

143

147

141

145

501

505

503

507

METHOD AND APPARATUS FOR PLACING A SHARED MICRO-MOBILITY VEHICLE IN PUBLIC SPACES

BACKGROUND

Mapping and navigation service providers are continually challenged to provide compelling services and applications. One area of development is providing shared micro-mobility vehicle placing/parking guidance information particularly in crowded areas such as city centers, business districts, and/or the like. In particular, shared micro-mobility vehicles need to stop at a location (e.g., for later use, for a different user, etc.) may find it difficult to find such location on areas without officially designated parking locations (e.g., sidewalks) where parking locations are limited by local laws (e.g., no obstruction of pedestrian movement) or by objects (e.g., trees, sign posts, parking meters, trash cans, fences, fire hydrants, etc.), or otherwise already occupied. There are web applications providing mapping information of bike racks, off-sidewalk parking corrals, etc. However, the is no mapping information for parking shared micro-mobility vehicle in areas without officially designated parking locations. In addition, there are mobile applications showing all nearby micro-mobility vehicles in one map, but no live parking availability information for additional micro-mobility vehicles in the map. As a result, service providers face significant technical challenges to determine and present such location and live availability information for service providers and users to determine placement location(s) in a public space for a shared micro-mobility vehicle in the areas.

Some Example Embodiments

Therefore, there is a need for an approach for providing shared micro-mobility vehicle placing location information considering real-time/dynamic factors in a public space (e.g., a sidewalk) without officially designated parking locations, using, for example, a shared vehicle placement score per location indicating a degree of accommodating or avoiding interferences with the usage of such public space.

According to example embodiment(s), a method for determining one or more placement locations on a sidewalk area that are suitable for temporary placement of a shared micro-mobility vehicle, comprises identifying, by one or more processors, a candidate placement location in the sidewalk area. The method also comprises determining, by the one or more processors, one or more factors associated with the candidate placement location and/or one or more nearby locations in the sidewalk area. The one or more factors comprise one or more of: a current or predicted people flow, a bicycle lane, presence of one or more objects, a point of interest, a vehicle parking area, a transit station, or a sidewalk configuration. The method further comprises making a determination, by the one or more processors, of whether the candidate placement location in the sidewalk area is suitable for temporary placement of the shared micro-mobility vehicle based on whether the candidate placement location enables one or more of following: (i) avoiding interference between the shared micro-mobility vehicle and (a) the current or predicted people flow, (b) the bicycle lane, and/or (c) the one or more objects, (ii) preventing the shared micro-mobility vehicle from hindering usage of (a) the point of interest, (b) the vehicle parking area, and/or (c) the transit station, or (iii) accommodating the shared micro-mobility vehicle to the sidewalk configuration. The method further comprises based on the determination, outputting, by the one or more processors, an indication of whether the candidate placement location in the sidewalk area is suitable for temporary placement of the shared micro-mobility vehicle.

According to another embodiment, an apparatus for determining one or more placement locations on a sidewalk area that are suitable for temporary placement of a shared micro-mobility vehicle, comprises at least one processor, and at least one memory including computer program code for one or more computer programs, the at least one memory and the computer program code configured to, with the at least one processor, cause, at least in part, the apparatus to identify a candidate placement location in the sidewalk area. The apparatus also is caused determine one or more factors associated with the candidate placement location and/or one or more nearby locations in the sidewalk area. The one or more factors comprise one or more of: a current or predicted people flow, a bicycle lane, presence of one or more objects, a point of interest, a vehicle parking area, a transit station, or a sidewalk configuration. The apparatus further is caused to make a determination of whether the candidate placement location in the sidewalk area is suitable for temporary placement of the shared micro-mobility vehicle based on whether the candidate placement location enables one or more of following: (i) avoiding interference between the shared micro-mobility vehicle and (a) the current or predicted people flow, (b) the bicycle lane, and/or (c) the one or more objects, (ii) preventing the shared micro-mobility vehicle from hindering usage of (a) the point of interest, (b) the vehicle parking area, and/or (c) the transit station, or (iii) accommodating the shared micro-mobility vehicle to the sidewalk configuration. The apparatus further is caused to, based on the determination, output an indication of whether the candidate placement location in the sidewalk area is suitable for temporary placement of the shared micro-mobility vehicle.

According to another embodiment, a non-transitory computer-readable storage medium for determining one or more placement locations on a sidewalk area that are suitable for temporary placement of a shared micro-mobility vehicle, carries one or more sequences of one or more instructions which, when executed by one or more processors, cause, at least in part, an apparatus to identify a candidate placement location in the sidewalk area. The apparatus also is caused determine one or more factors associated with the candidate placement location and/or one or more nearby locations in the sidewalk area. The one or more factors comprise one or more of: a current or predicted people flow, a bicycle lane, presence of one or more objects, a point of interest, a vehicle parking area, a transit station, or a sidewalk configuration. The apparatus further is caused to make a determination of whether the candidate placement location in the sidewalk area is suitable for temporary placement of the shared micro-mobility vehicle based on whether the candidate placement location enables one or more of following: (i) avoiding interference between the shared micro-mobility vehicle and (a) the current or predicted people flow, (b) the bicycle lane, and/or (c) the one or more objects, (ii) preventing the shared micro-mobility vehicle from hindering usage of (a) the point of interest, (b) the vehicle parking area, and/or (c) the transit station, or (iii) accommodating the shared micro-mobility vehicle to the sidewalk configuration. The apparatus further is caused to, based on the determination, output an indication of whether the candidate placement location in the sidewalk area is suitable for temporary placement of the shared micro-mobility vehicle.

According to another embodiment, a computer program product may be provided. For example, a computer program product for determining one or more placement locations on a sidewalk area that are suitable for temporary placement of a shared micro-mobility vehicle, comprising instructions which, when the program is executed by a computer, cause the computer to identify a candidate placement location in the sidewalk area. The computer also is caused determine one or more factors associated with the candidate placement location and/or one or more nearby locations in the sidewalk area. The one or more factors comprise one or more of: a current or predicted people flow, a bicycle lane, presence of one or more objects, a point of interest, a vehicle parking area, a transit station, or a sidewalk configuration. The computer further is caused to make a determination of whether the candidate placement location in the sidewalk area is suitable for temporary placement of the shared micro-mobility vehicle based on whether the candidate placement location enables one or more of following: (i) avoiding interference between the shared micro-mobility vehicle and (a) the current or predicted people flow, (b) the bicycle lane, and/or (c) the one or more objects, (ii) preventing the shared micro-mobility vehicle from hindering usage of (a) the point of interest, (b) the vehicle parking area, and/or (c) the transit station, or (iii) accommodating the shared micro-mobility vehicle to the sidewalk configuration. The computer further is caused to, based on the determination, output an indication of whether the candidate placement location in the sidewalk area is suitable for temporary placement of the shared micro-mobility vehicle.

According to another embodiment, an apparatus for determining one or more placement locations on a sidewalk area that are suitable for temporary placement of a shared micro-mobility vehicle, comprises means for identifying a candidate placement location in the sidewalk area. The apparatus also comprises means for determining one or more factors associated with the candidate placement location and/or one or more nearby locations in the sidewalk area. The one or more factors comprise one or more of: a current or predicted people flow, a bicycle lane, presence of one or more objects, a point of interest, a vehicle parking area, a transit station, or a sidewalk configuration. The apparatus further comprises means for making a determination of whether the candidate placement location in the sidewalk area is suitable for temporary placement of the shared micro-mobility vehicle based on whether the candidate placement location enables one or more of following: (i) avoiding interference between the shared micro-mobility vehicle and (a) the current or predicted people flow, (b) the bicycle lane, and/or (c) the one or more objects, (ii) preventing the shared micro-mobility vehicle from hindering usage of (a) the point of interest, (b) the vehicle parking area, and/or (c) the transit station, or (iii) accommodating the shared micro-mobility vehicle to the sidewalk configuration. The apparatus further comprises means for based on the determination, outputting an indication of whether the candidate placement location in the sidewalk area is suitable for temporary placement of the shared micro-mobility vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining placement location(s) in a public space for a shared micro-mobility vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "public space" refers to a place generally open and accessible to people, such as sidewalks, public squares, parks, beaches, government buildings, public libraries, open spaces accessible to the public, etc. that include an area without officially designated locations for placing shared micro-mobility vehicles.

As used herein, the term "area without officially designated locations for placing shared micro-mobility vehicles" refers to a geographic area with locations not prohibited from placing a shared micro-mobility vehicle yet not officially designated (e.g., by law or by a property owner of the area) for placing a shared micro-mobility vehicle. For instance, the area can be any location/area on or within a sidewalk. When a sidewalk without any micro-mobility vehicle corral markings, its "area" considered by the system includes the whole sidewalk surface. However, if the sidewalk already marked with a micro-mobility vehicle corral, its "area" considered by the system excludes such micro-mobility vehicle corral.

As used herein, the term "micro-mobility vehicles" refer to is a range of small modes of transport for people and/or cargo, and driven autonomously (e.g., smart delivery bots) or by users personally (e.g., bicycles, e-bikes, electric scooters, electric skateboards, shared bicycles, electric pedal assisted bicycles, etc.). Micro-mobility vehicles can be subject to local laws regarding weights (e.g., below 100 pounds), operating speeds (e.g., below 25 km/h (15 mph)), areas (e.g., riding only on bike lanes but not on sidewalks or walking trails, etc.), rider ages (e.g., at least 14 years old), etc.

Although various embodiments are described with respect to land/terrestrial micro-mobility vehicles, it is contemplated that the approach described herein may be used with other micro-mobility vehicles, such as watercraft, drones, aerial vehicles, spacecraft, etc. The micro-mobility vehicle can fit inside the location, either by parallel parking, perpendicular parking or angled parking.

Figure 1A:
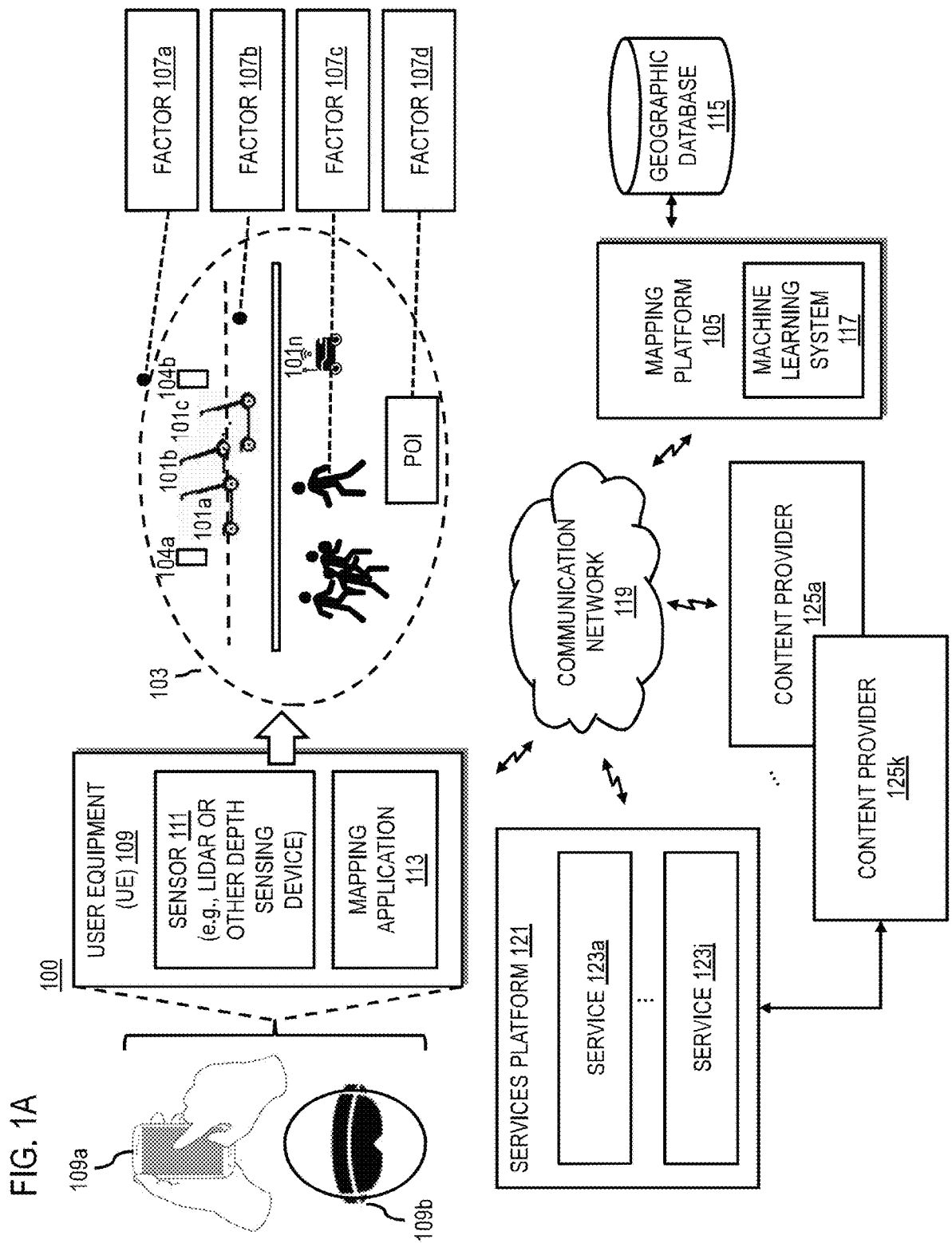
FIG. 1A is a diagram of a system for determining placement location(s) in a public space for a shared micro-mobility vehicle, according to example embodiment(s)
Figure 1B:
FIG. 1B are images of a scenario for operators to determine placement location(s) in a public space for a shared micro-mobility vehicle, according to example embodiment(s)
Figure 1B:
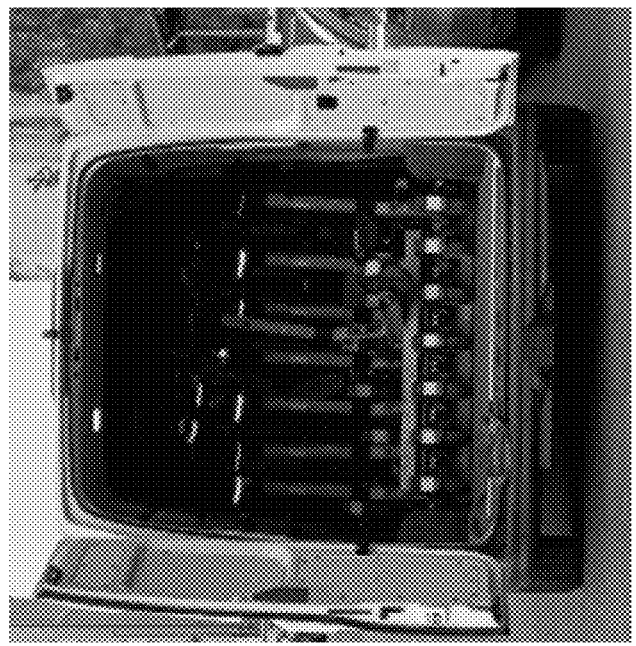

FIG. 1A is a diagram of a system for determining placement location(s) in a public space (e.g., a sidewalk) for a shared micro-mobility vehicle, according to example embodiment(s). Providing mapping and navigation data (e.g., including data on where to park) options is an area of interest for service providers, original equipment manufacturers (OEMs), and/other navigation related companies (e.g., advanced driver assistance systems (ADAS)). For example, looking for placing micro-mobility vehicles (e.g., on sidewalks, squares, plazas, or other public spaces), particularly in urban or congested areas, can be stressful and difficult for shared micro-mobility vehicle operators and users. Currently, the operators can distribute and rebalance micro-mobility vehicles throughout the day at different locations based on historical usage, demand areas, local authority requirements (e.g., equal access including underserved communities, number and/or density caps in downtown areas, when to move/remove stagnant, unsafe or inoperable vehicles, etc.), etc. FIG. 1B are images of a scenario for operators to determine placement location(s) in a public space for a shared micro-mobility vehicle, according to example embodiment(s). In an image 131, a dispatching truck is loaded with electric scooter. However, as shown in an image 133, the unloading location for the shared micro-mobility vehicles is behind work zone fences and hard to reach. There is a need to support the dispatching by considering the surrounding context, such as flow of people (e.g., to avoid being in the way of the crowd), proximity of points of interest (POIs e.g., shops, schools, etc.), bike lanes (sometimes not clearly visible, especially as the distribution often happens at night), regular vehicle parking spots, etc., while complying with local laws. For instance, the local laws require shared bike operator to pick up the shared bikes from spots by 6 am to avoid blocking people traffic, or other operational and logistics considerations (e.g., street cleaning).

Figure 1C:
FIG. 1C are images of scenarios of poorly placed shared micro-mobility vehicles by users, according to example embodiment(s)
Figure 1C:
Figure 1C:
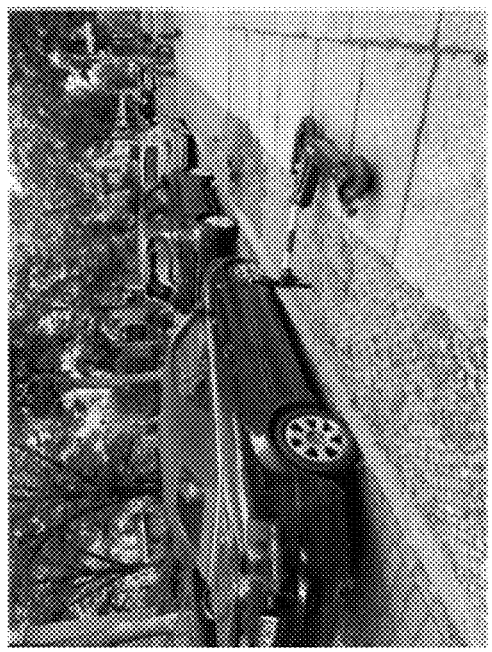
Figure 1C:

In terms of user placement of shared micro-mobility vehicles, there are e-scooters irresponsibly left on sidewalks that can interfere with pedestrian traffic, baby strollers, wheelchairs, etc. FIG. 1C are images of scenarios of poorly placed shared micro-mobility vehicles by users, according to example embodiment(s). In an image 141, an e-scooter fells on a sidewalk and its handle bar blocks a door of a parked vehicle. In an image 143, an e-scooter fells into a bike lane on a sidewalk. In an image 145, three e-scooters stand on the sidewalk around a large store, although not in the bike lane yet in the way of pedestrians and can be a bigger problem at a peak time. In an image 147, five e-scooters stand on the sidewalk without interfering with the bike lane or pedestrian flow, yet can be more efficiently placed to safe space.

There are maps published by cities, schools, etc. showing designated parking areas for shared micro-mobility vehicles, yet no maps or mobile applications to guide users to determine placement location(s) in a public space for a shared micro-mobility vehicle on public walking spaces, such as sidewalks, without officially designated placing locations for shared micro-mobility vehicles. Therefore, service providers face significant technical challenges with respect locating and recommending locations for operators and/or user to determine placement location(s) in a public space for a shared micro-mobility vehicle and related guidance data, where there is no officially designated areas for determining placement location(s) in a public space for a shared micro-mobility vehicle.

To address these technical challenges, a system 100 of FIG. 1 introduces a capability of determining one or more placement locations on a sidewalk area that are suitable for temporary placement of a shared micro-mobility vehicle. In one embodiment, the system 100 can considers factors such as flow of people, proximity of POIs, presence of one or more objects, sidewalk configuration(s), bike lanes, regular vehicle parking spots, local laws, etc. to determine optimal locations to place shared micro-mobility vehicles 101a-101n (hereinafter shared micro-mobility vehicles 101). For instance, shared micro-mobility vehicles 101a-101c are e-scooters, while e-scooter 101n is a smart delivery bot.

In one embodiment, the system 100 can consider these factors with respect to demand and supply of the micro-mobility vehicles 101. For instance, the system 100 can determine an expected parking duration for a the shared micro-mobility vehicle 101 based on, e.g., an expected/ determined demand for the shared micro-mobility vehicle based on the people flow, POI, transit station, etc. For instance, the system 100 can estimate demands based on historical flow, mobility data (e.g., how long is parking time before picked up, check-in, check-out characteristics, OD matrix, event-based demand, weather, etc.). The system 100 can comparing that duration to expected conditions in the sidewalk area during that time frame (e.g., expected increase or decrease in nearby pedestrian flow), so as to assess whether the placement location at issue is suitable/acceptable. The system 100 can also adjust a cost of using the shared micro-mobility vehicle 101 based on various sidewalk placement considerations, such as incentive(s) to place the vehicle in recommended locations (e.g., dropping a non-functioning, broken or low (2%) batteries vehicle at a collection spot get discount), higher price for placing at undesirable location(s), etc.

In one embodiment, the system 100 can leverage sensor data (e.g., image data, LIDAR data, etc.) and high definition (HD) map data (e.g., precise to a centimeter level) to determine the positions and/or configurations of a sidewalk area 103, objects 104 on the sidewalk area (e.g., posts 104a, 104b), etc., in order to determine available spaces on the sidewalk area 103 to place the shared micro-mobility vehicles 101. The HD Maps can be computed by aggregating multiple data sources including LIDAR images to provide a high fidelity view of the surroundings.

Concurrently or alternatively, the system 100 can apply image segmentation to image data to determine the relevant sidewalk and/or object features as an input to determine available spaces on the sidewalk area 103 to place the shared micro-mobility vehicles 101. For instance, the system 100 can use image segmentation to understand all relevant features of the sidewalk and/or objects (such as streetlights, posts, trash can, benches, etc.) that could be used as an input to the dispatching algorithm.

In another embodiment, the system 100 can filter the available spaces on the sidewalk area 103 based on factors 107 such as a regular vehicle parking space 107a, a bike lane 107b, a people flow 107c, a POI 107d, etc., to determine candidate placement location(s) on the sidewalk area 103. For instance, the system 100 can determine the people flow 107c from probe data, sensor data, camera data, etc. In order to place shared micro-mobility vehicles safely, the system 100 can determine how people are using the public space (e.g., the sidewalk area 103) to navigate from places to places therein. For instance, the system 100 can model the people flow, the most walked paths, the type of POIs around, and the foot traffic nearby POIs can bring into the public space as well as the maximum amount of people passing via the public space, to be able to deal with such maximum throughput without having shared micro-mobility vehicles in the way, e.g., at the exit of a public transport station. By analogy, the system 100 can model a shared micro-mobility vehicle flow via the public space, and to place shared micro-mobility vehicles therein without interfering with current or future shared micro-mobility vehicle flows via the public space.

In another embodiment, the system 100 can calculate a shared vehicle placement score per candidate placement location based the factors that reflects a level of suitability the candidate placement location in the sidewalk area 103 for temporary placement of a shared micro-mobility vehicle. For instance, the less a shared micro-mobility vehicle placed on the location can interfere with and a current or predicted people flow, a bicycle lane, and/or the one or more objects, the better/higher the location's shared vehicle placement score. As another instance, the less a shared micro-mobility vehicle placed on the location can hinder usage of the point of interest, the vehicle parking area, and/or a transit station, the better/higher the location's shared vehicle placement score. As another instance, the more a shared micro-mobility vehicle placed on the location can accommodate to the sidewalk configuration, and/or the one or more object configurations, the better/higher the location's shared vehicle placement score.

In one embodiment, the shared vehicle placement score is determined based additional contextual parameters such as but not limited to time of day, day of the week, month, season, weather, events (e.g., parades, protest, concerts, festivals, etc.), etc.

Instead of recommending "suitable locations" versus "unsuitable locations," the system 100 can provide the score for the operators to leverage in their dispatching processes and/or for the users to placing the shared micro-mobility vehicles after use. The system 100 can prepare two map layers for the operators and the users, since they have different considerations. The operators concern dispatching and maintenance convenience), while the users concern riding and reaching destination convenience.

The score can assist making the operator making decisions such as the number, type, or mixed types of shared micro-mobility vehicles to place in a selected location (e.g., 3 kick-scooters, or 2 e-bikes and 2 scooters, etc.), or areas. Some vehicles may be checked out by users very some, some a few hours, some not non-functioning ones with broken batteries need to be picked up for repair. For example, the system 100 can alert an operator: "You have 50 vehicles parking at un-recommended spots. You may want to prioritize to pick them up."

The system 100 can also provide a justification for each score so that the operators or dispatchers can have better understanding of the reason(s) behind the score. For instance, area A has a low score as many people take this sidewalk during lunch time, so even if people flow is not visible now, it is better to avoid placing vehicles in area A. As another instance, the low score is due to the bike lane.

In one embodiment, the system 100 can assemble the candidate placement location(s) and/or the shared vehicle placement score per location into a map layer, for example, as an input to a dispatching algorithm by the operators. In another embodiment, the system 100 can apply the map layer to guide a user to place/return a shared micro-mobility vehicle at the most suitable spot near a destination. For instance, when the user is approaching a destination, the system 100 can recommend a placing location based on a user destination and the map layer. In another embodiment, the system 100 can consider a vehicle attribute/feature (e.g., type, model, weight, size, maneuverability, origin/destination, mobility graphs, etc. of the shared micro-mobility vehicles 101), a number of vehicles involved (e.g., when several users are traveling together), a distance to the destination, etc., in addition to the factors 107 thereby calculating the location's shared vehicle placement score with respect to a user destination.

Although various embodiments are described with respect to shared micro-mobility vehicles, it is contemplated that the approach described herein may be used with privately owned micro-mobility vehicles, which are better securely attached to something (e.g., shown on another map layer of objects for the privately owned micro-mobility vehicles to attach to).

In one embodiment, the system 100 can detect that the user is approaching a destination, based on a user-entered destination, user historical travel patterns (e.g., a mobility graph), user behaviors revealing near destination arrival (e.g., user taking user equipment (UE) 109 after stopping/pausing), etc.

For instance, the smaller the vehicle type/model or the shape of the vehicle type/model more conform to an available space at the location, the more shared micro-mobility vehicles can be placed on the location, the better/higher the location's shared vehicle placement score with respect to the vehicle type/model. As another instance, the closer an available space at the location can accommodate the number of vehicles need to be placed, the better/higher the location's shared vehicle placement score. As another instance, the closer the location to a destination of the user, the better/higher the location's shared vehicle placement score with respect to the user. The system 100 can then generates a ranking list of candidate placement locations (e.g., ideally within 20-30 meters maximum from the destination) based on the scores to recommend to the user.

In one embodiment, the shared vehicle placement score can be calculated for a location based on a formula (1), and n is a number of the factors. For instance, the Weighting can be a probability value, and both the Weighting and the Factor can be expressed as a function of time.

$$\Sigma_{i=1}^{n}(\text{Weighting } i(t) * \text{Factor } i(t)) \quad (1)$$

Once the user has selected a placement location, the system 100 can guide the user to the location. The guidance can be audio, visual, app, augmented reality (AR0, etc. depending on available user interface(s) of the UEs 109 and/or the shared micro-mobility vehicle 101. Beside the typical geographic coordinates navigation to the public space (e.g., the sidewalk area 103), the system 100 can provide guidance on how to exactly position the micro-mobility vehicle 101 in the public space (e.g., between two posts 104*a*, 104*b* on the sidewalk area 103). Taking an AR interface as an example, the system 100 can overlay a 3D model of the shared micro-mobility vehicle a pair of smart glasses so that the user simply needs to place the shared micro-mobility vehicle 101 on the proposed position and/or orientation.

Due to the highly dynamic nature of the factors 107 (e.g., people flow, occupancy by other shared micro-mobility vehicles, events, etc.) in the sidewalk area 103, the system 100 can gather and process static and dynamic sensor data to find optimal candidate placement locations based on public space attributes/features (e.g., dimensions, shapes, directionality, traffic of path links nearby, etc.), public space usage attributes/features (e.g., people flow data, designated or not, paved or not, usage restrictions (e.g., temporary event limits including street fairs, festival, etc.), fee or free, churn rates, occupancy/usage patterns, etc.), vehicle attributes/features (e.g., type, model, weight, size, maneuverability, origin/destination, mobility graphs, etc. of the shared micro-mobility vehicles 101), user attributes/features (e.g., user demographic data, preference data, with special needs or not, etc.), delivery attributes/features (e.g., weights, sizes, pickup/drop-off locations of packages to be delivered, etc.), POI attributes/features (e.g., operation hours, entry/exit/loading locations, etc.), traffic attributes/features (e.g., light, medium, heavy, blocked, etc.), weather attributes/features (e.g., rain, snow, etc.), etc., to determine a shared vehicle placement score per candidate location.

The static and dynamic location based sensor data may be retrieved from various local and/or external databases. For example, the system 100 can obtain the public space attributes, the POI attributes, etc. from a geographic database 115.

In one embodiment, the sensor data can be collected by sensor(s) 111 (including a LiDAR sensor) of the UE 109 (e.g., a mobile phone 109*a*, augmented-reality device 109*b*, wearable device, head-mounted device, tablet, portable computer, etc. In another embodiment, the sensor data can be collected by the shared micro-mobility vehicles 101 built-in with camera, LiDAR sensors, etc. In another embodiment, the sensor data can be collected by passing non-micro-mobility vehicles (e.g., autonomous vehicles, delivery trucks, etc.) equipped with camera, LiDAR sensors, etc. In another embodiment, the sensor data can be collected by Internet of things (IoT) on or nearby the sidewalk area 103, such as security cameras, traffic cameras, etc.

For instance, the system 100 can allow the operators to understand the movement of people in the selected locations to place the shared micro-mobility vehicles safely not only during the placing process, but also after the placement. The system 100 can assess the quality of a placement location as to avoid the risk of shared micro-mobility vehicles to fall from their original locations into other areas, such as POIs, bike lanes, regular vehicle packing spaces, etc. The system 100 can provide a score for every candidate placement location on the sidewalk area based on movement of people, bike lanes, etc. such that operators could leverage the score in their vehicle placement processes.

In one embodiment, the system 100 combines various static and dynamic factors based sensor data to train a shared vehicle placement score model (e.g., a machine learning model) in order to generate a map layer for quick access. The system 100 then recommends the most suitable placement location based on the computed score.

Therefore, the system 100 can evaluate (e.g., static or temporary) objects on a public space (e.g., a sidewalk), and 'real-time' assess a dynamic environment on the sidewalk for determining placement location(s) in the public space for a shared micro-mobility vehicle.

Figure 2:
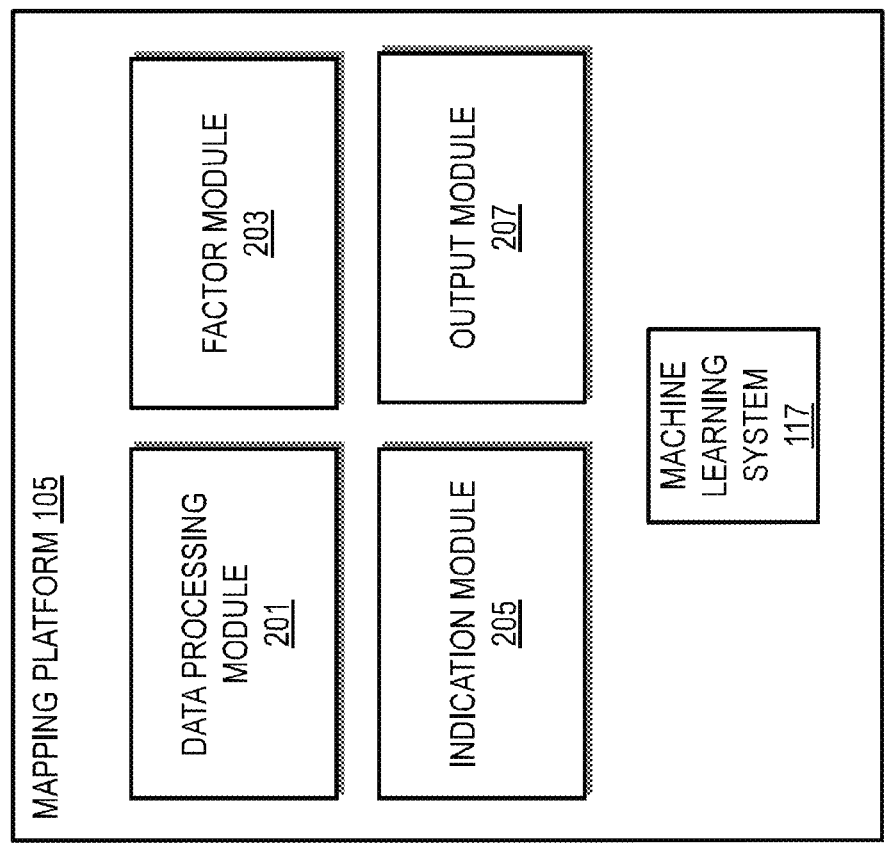
FIG. 2 is a diagram of the components of a mapping platform, according to example embodiment(s)

FIG. 2 is a diagram of the components of a mapping platform 105, according to example embodiment(s). By way of example, the mapping platform 105 includes one or more components for determining placement location(s) in a public space for a shared micro-mobility vehicle, according to example embodiment(s) described herein. It is contemplated that the functions of these components may be combined or performed by other components of equivalent functionality. In this embodiment, the mapping platform 105 includes a data processing module 201, a factor module 203, an indication module 205, an output module 207, and the machine learning system 117. The above presented modules and components of the mapping platform 105 can be implemented in hardware, firmware, software, or a combination thereof. Though depicted as a separate entity in FIG. 1, it is contemplated that the mapping platform 105 may be implemented as a module of any of the components of the system 100 (e.g., a component of the micro-mobility vehicle 101, navigation system of the micro-mobility vehicle 101, UE 109, mapping application 113 in UE 109, and/or the machine learning system 117). In another embodiment, one or more of the modules 201-207 and the machine learning system 117 may be implemented as a cloud based service, local service, native application, or combination thereof. The functions of these modules are discussed with respect to FIGS. 3-6 below.

Figure 3:
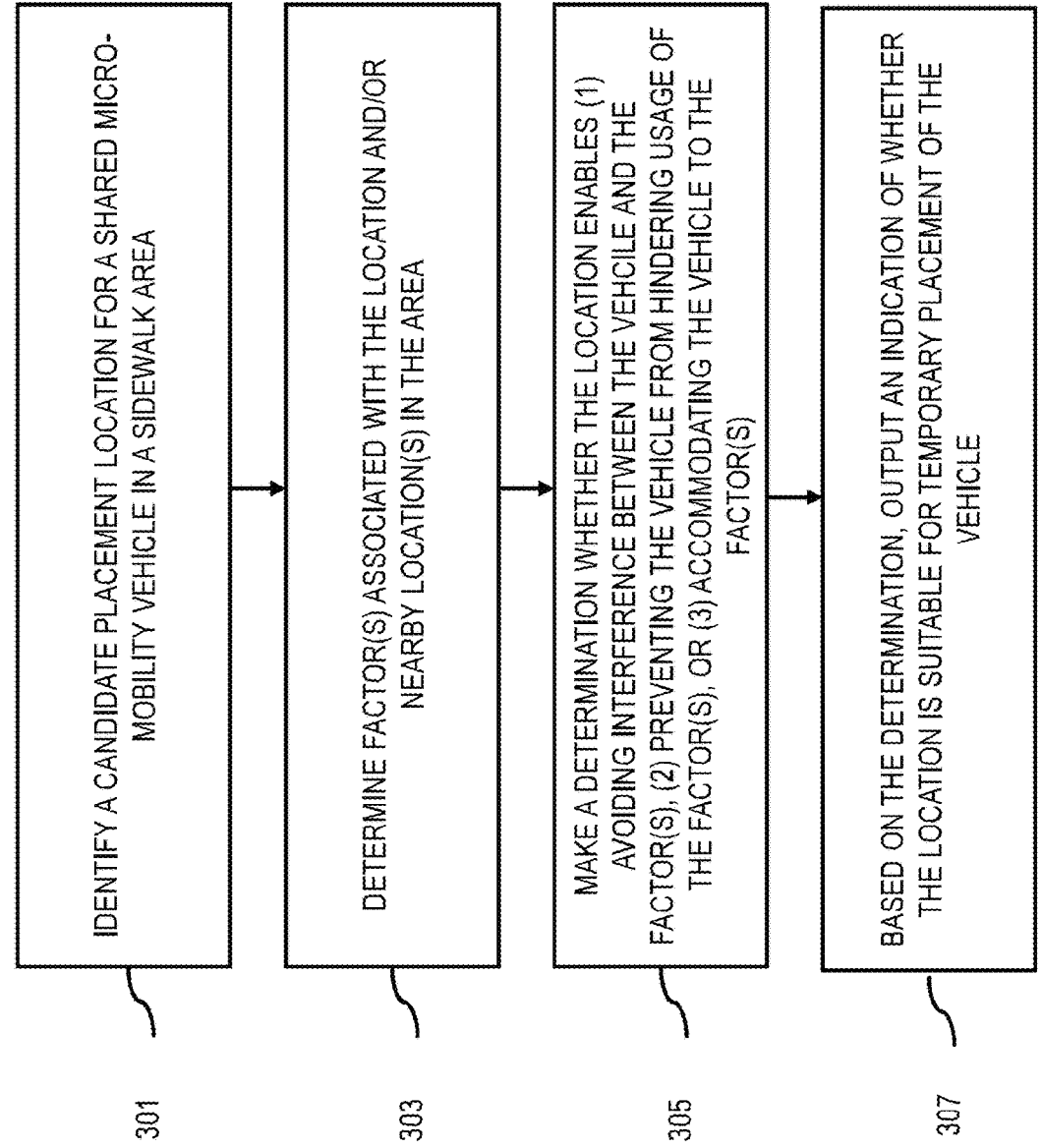
FIG. 3 is a diagram of a process for determining placement location(s) in a public space for a shared micro-mobility vehicle, according to example embodiment(s)
Figure 9:
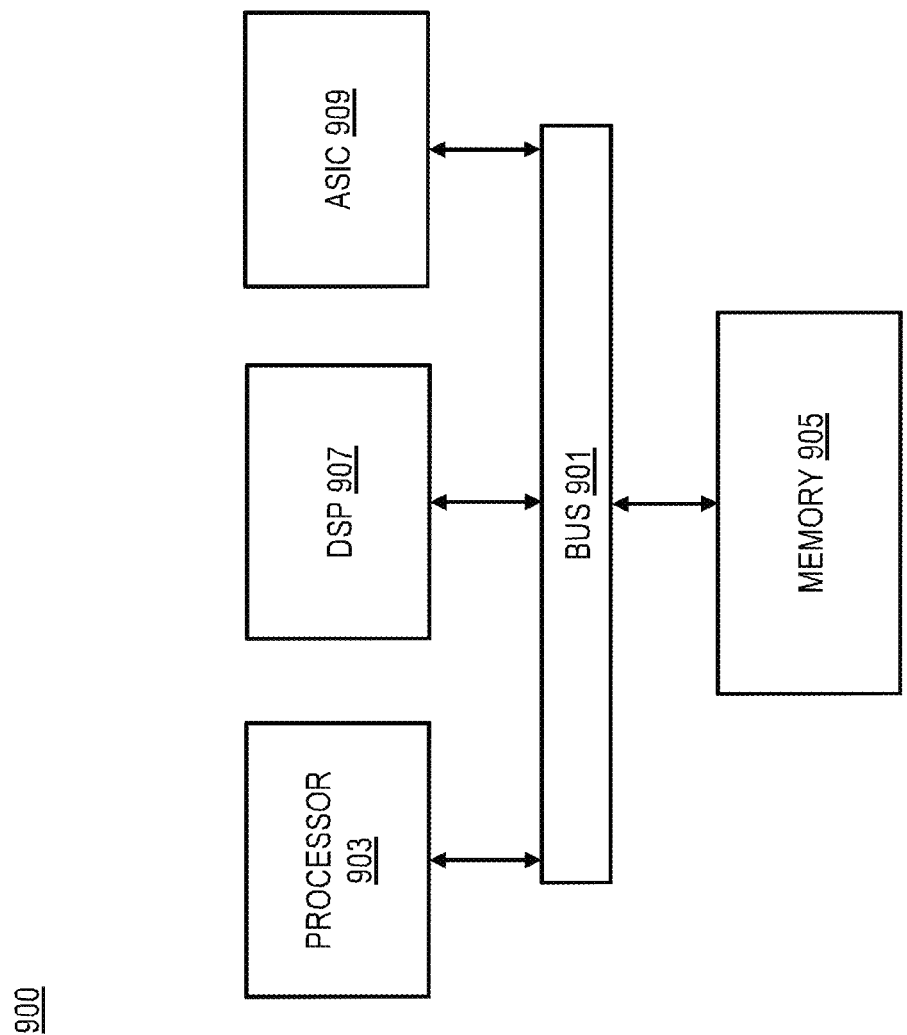
FIG. 9 is a diagram of a chip set that can be used to implement an embodiment.

FIG. 3 is a diagram of a process for determining placement location(s) in a public space for a shared micro-mobility vehicle, according to example embodiment(s). In various embodiments, the mapping platform 105, any of the modules 201-207, and/or the machine learning system 117 as shown in FIG. 2 may perform one or more portions of the process 300 and may be implemented in, for instance, a chip set including a processor and a memory as shown in FIG. 9. As such, the mapping platform 105, any of the modules 201-207, and/or the machine learning system 117 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, for example, in step 301, the data processing module 201 can identify a candidate placement location for a shared micro-mobility vehicle in the sidewalk area.

In one embodiment, in step 303, the factor module 203 can determine one or more factors associated with the candidate placement location and/or one or more nearby locations in the sidewalk area, and the one or more factors can comprise one or more of: a current or predicted people flow, a bicycle lane, presence of one or more objects (e.g., a post, a tree, a traffic sign, a bench, a trash can, etc.), a point of interest (e.g., a supermarket, flower store, etc.), a vehicle parking area, a transit station, or a sidewalk configuration.

In one embodiment, the data processing module 201 can work in conjunction with the factor module 203 to process LiDAR data, image data, or a combination thereof to determine the sidewalk area, the candidate placement location, the one or more factors, or a combination thereof.

A LiDAR scan can include point clouds each of which contains a set of points that describe an object or surface, and each of the points contains an amount of data (e.g., location, color, material, etc.) that can be integrated with other data sources or used to create 3D models. It is noted that although the various embodiments described herein are discussed with respect to using the LiDAR sensor 111 of the UE 109 to generate LiDAR scans, it is contemplated that any other type of depth sensing sensor (e.g., stereoscopic camera arrangements up to a limited distance, or any other time-of-flight sensor capable of generating a point cloud representation of an environment) can be used equivalently in the embodiments described herein.

By way of example, the LiDAR sensor 111 can scan a public space by transmitting laser pulses to various points in the public space and records the time delay of the corresponding reflected laser pulse as received at the LiDAR sensor 111. The distance from the LiDAR sensor 111 to a particular point in the public space can be calculated based on the time delay. When the distance is combined with an elevation of the laser pulse as emitted from the LiDAR sensor 111, a three-dimensional (3D) coordinate point can be computed to represent the point on a surface in the public space to which the laser pulse was directed. By scanning multiple points in the public space, the LiDAR sensor 111 can generate a three-dimensional (3D) point cloud representation of the public space (e.g., LiDAR scan). In one embodiment, the LiDAR sensor 111 sensor can be a hyperspectral sensor that scans the public space with laser pulses at different wavelengths to determine additional surface characteristics (e.g., surface material, etc.). For example differences in the time delay at different wavelengths can be indicative of differences in surface characteristics, and thus can be used to identify a surface characteristic. These additional characteristics can also be included in the factors 107.

Figure 4A:
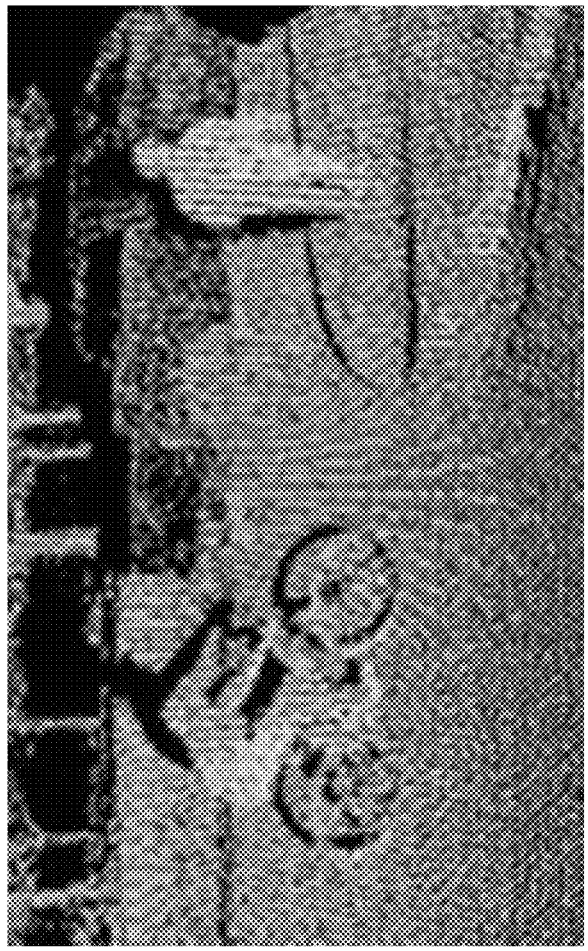
FIG. 4A is a diagram illustrating an example light detection and ranging (LIDAR) scan of a public space, according to example embodiment(s)

In one embodiment, the factor module 203 can extract from the LiDAR scan (e.g., by extracting features from the 3D point cloud, subsampling the 3D point cloud, cropping the 3D point cloud, etc.), information about where the current or predicted people flow, the bicycle lane, the one or more objects, the point of interest, the vehicle parking area, the transit station, etc. are located, information about factor characteristics/attributes found at each location, among other information. For instance, FIG. 4A is a diagram illustrating an example LiDAR scan 400 of a public space, according to example embodiment(s). In this case, multiple point clouds of a sidewalk, a shared bicycle, a pedestrian, and trees in the background can be used to determine corresponding factors 107 for the process 300.

In one embodiment, the UE 109 can be a head mounted device or any other wearable device that is equipped with a LiDAR sensor 111 or equivalent depth sensing sensor. In this use case, such head-mounted or wearable portable devices can make the capturing of a LiDAR scan more intuitive and convenient, without having to lift the UE 109 to point in a direction to capture features of the public space. In yet another embodiment, the data processing module 201 can work in conjunction with the factor module 203 to process LIDAR data using image segmentation to determine the sidewalk area, the candidate placement location, the one or more factors, or a combination thereof, and the indication can determined in real-time or substantially real-time based on the LiDAR data. In one embodiment, the machine learning system 117 can perform image segmentation to identify the factors 107 in an image on a pixel-by-pixel basis. For example, to perform image segmentation, the machine learning system 117 can use a Mask R-CNN or equivalent as an example implementation of image segmentation deep learning network. Mask R-CNN, for instance, enables image segmentation of input images so that individual pixels or groups of pixels of the input image can be classified into semantic categories corresponding instances of the factors 107. The instance segmentation produces an image mask for each instance of the factors 107 in a processed image as opposed to a bounding box (e.g., produced using YOLO or faster R-CNN in the various embodiments described above).

Figure 4B:
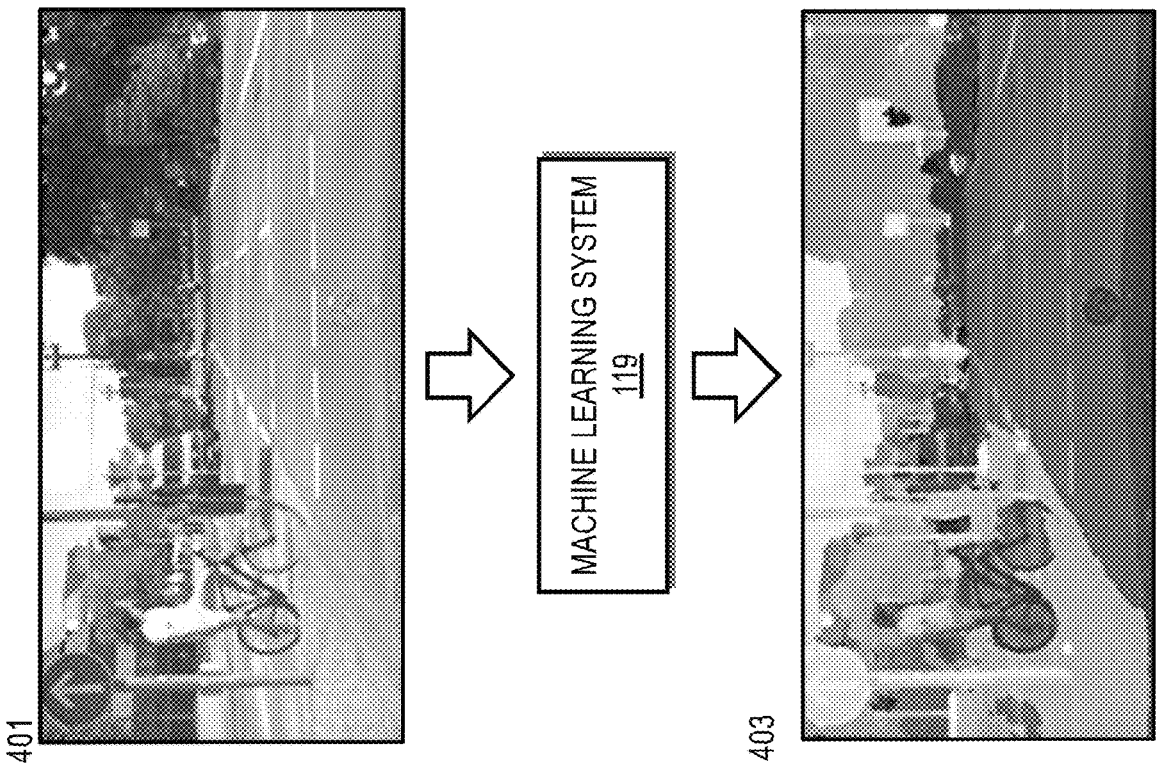
FIG. 4B is a diagram illustrating an example of machine-learning based image segmentation of sensor data for determining placement location(s) in a public space for a shared micro-mobility vehicle, according to example embodiment(s)

FIG. 4B is a diagram illustrating an example of machine-learning based image segmentation (e.g., via machine learning system 117) of sensor data for determining placement location(s) in a public space for a shared micro-mobility vehicle, according to example embodiment(s). In this example, an image 401 is captured (e.g., by a UE 109) of a user in a public space. The factor module 203 can distinguish among the factors 107, such as a sidewalk, a bicycle, a bicyclist, a road, a traffic sign, etc. using a machine learning-based image segmentation algorithm of the machine learning system 117 to classify parts of the image that depict the bicyclist and parts of the image that depict different factors 107. For example, the image 701 is fed as input into the machine learning system 117 which is uses a trained deep learning network (e.g., a Mask R-CNN) to generate the output 403 comprising the image 401 that has been segmented to identify different semantic categories. In this example, the bicyclist is identified in one image segment, while the sidewalk, the bicycle, the road, the traffic sign, etc. are identified as other image segments. Thus, a sensor data report for the image 401 would state that for the observed factor segments at corresponding locations with an image capture time.

In one embodiment, the data processing module 201 can process map data to determine the sidewalk area, the candidate placement location, the bicycle lane, the point of interest, the vehicle parking area, the transit station, the sidewalk configuration, or a combination thereof. For instance, the map data is high-definition map data retrieved from the geographic database 115 to determine precisely where such factors 107 are located to make the system 100 more efficient and reliable in determining placement location(s) in a public space for a shared micro-mobility vehicle.

In one embodiment, the current or predicted people flow can be determined based on people probe data collected from the sidewalk area (e.g., using big data analytics, artificial intelligence, etc.). For instance, the sensor data can include probe data collected from the one or more UEs 109 associated with one or more pedestrians traveling in the public space (e.g., the sidewalk area 103). In another embodiment, the factors 107 further include a current or predicted shared micro-mobility vehicle flow that can be determined based on shared micro-mobility vehicle probe data collected from the sidewalk area, where shared micro-mobility vehicles are allowed to travel on the sidewalk. For instance, the sensor data can include probe data collected from the shared micro-mobility vehicles 101 traveling in the public space (e.g., the sidewalk area 103).

Figure 4C:
FIG. 4C is an image overlaid with example people and shared micro-mobility vehicle trajectories in a public space, according to example embodiment(s)

The probe data, for instance, is a collection of probes/probe points comprising a probe identifier (e.g., to uniquely identify probes from a UE 109 or a shared micro-mobility vehicle 101), geolocation (e.g., latitude and longitude determined by a location sensor such as, but not limited to, a satellite-based location receiver, or equivalent), a time-stamp, and optionally additional parameters such as, but not limited to, a speed, and/or the like. In this embodiment, the factor module 203 processes the probe data to determine the current or predicted people flow and/or the current or predicted shared micro-mobility vehicle flow that should not be interfered by the placement of a shared micro-mobility vehicle 101. The factor module 203 can construct a path or trajectory from the individual location data points of the probe points in the probe data by, for instance, arranging all the probe points that are associated with a single probe identifier in chronological order and connecting the probe points to describe a trajectory for the current or predicted people flow and/or the current or predicted shared micro-mobility vehicle flow. FIG. 4C is an image 405 overlaid with example people and shared micro-mobility vehicle trajectories in a public space, according to example embodiment(s). In the image 405 of a public space (e.g., the sidewalk area 103), people trajectories are in white dots, and shared micro-mobility vehicle trajectories are in black dots.

In another embodiment, the current or predicted people flow and/or the current or predicted shared micro-mobility vehicle flow can be estimated based on the bicycle lane, the point of interest, the vehicle parking area, the transit station, the sidewalk configuration, or a combination thereof. For instance, the factor module 203 can establish a baseline people flow and/or a baseline shared micro-mobility vehicle flow based on the probe data, then modify the flow data by including impacts of the bicycle lane, the point of interest, the vehicle parking area, the transit station, the sidewalk configuration, or a combination thereof.

In one embodiment, in step 305, the indication module 205 can make a determination of whether the candidate placement location in the sidewalk area is suitable for temporary placement of the shared micro-mobility vehicle based on whether the candidate placement location enables one or more of following: (i) avoiding interference between the shared micro-mobility vehicle and (a) the current or predicted people flow, (b) the bicycle lane, and/or (c) the one or more objects, (ii) preventing the shared micro-mobility vehicle from hindering usage of (a) the point of interest, (b) the vehicle parking area, and/or (c) the transit station, or (iii) accommodating the shared micro-mobility vehicle to the sidewalk configuration. In one embodiment, the data processing module 201 can work in conjunction with the factor module 203 to determine physical dimensions of the sidewalk area, the candidate placement location, or a combination thereof available to support the placing of the shared micro-mobility vehicle based on the current or predicted people flow.

In one embodiment, the indication module 205 can determine a probability that the micro-mobility shared vehicle may fall into a pedestrian path, a bicycle lane, or a combination thereof based on the current or predicted people flow, and the indication can be further based on the probability. In another embodiment, the indication module 205 can determine a probability that the micro-mobility shared vehicle may fall into a pedestrian path, a bicycle lane, or a combination thereof based on at least one contextual parameter (e.g., time of the day, weather, events, etc.), and the indication can be further based on the probability.

In one embodiment, making the determination comprises determining a shared vehicle placement score indicating how suitable the candidate placement location is for temporary placement of the shared micro-mobility vehicle in the sidewalk area based on one or more additional factors, and the one or more additional factors can include a temporal parameter (e.g., a lunch time people traffic peak), a weather parameter (e.g., strong wind, heavy rain/snow, etc.), an event parameter (e.g., a street festival), or a combination thereof.

Figure 5A:
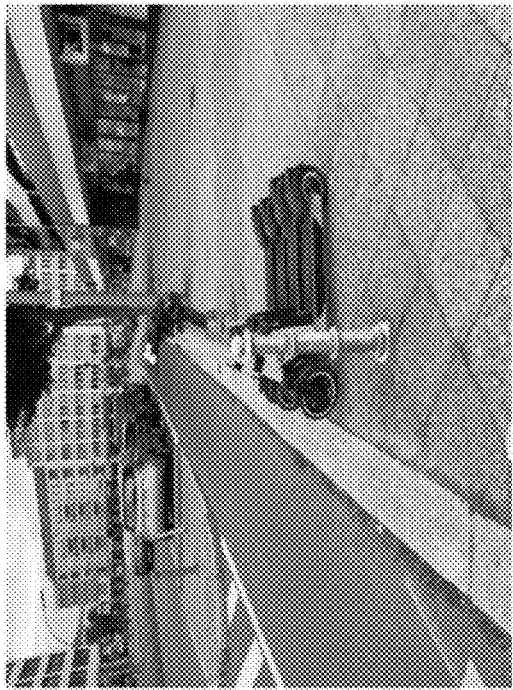
FIG. 5A are images of scenarios of properly placed shared micro-mobility vehicles, according to example embodiment(s)
Figure 5A:
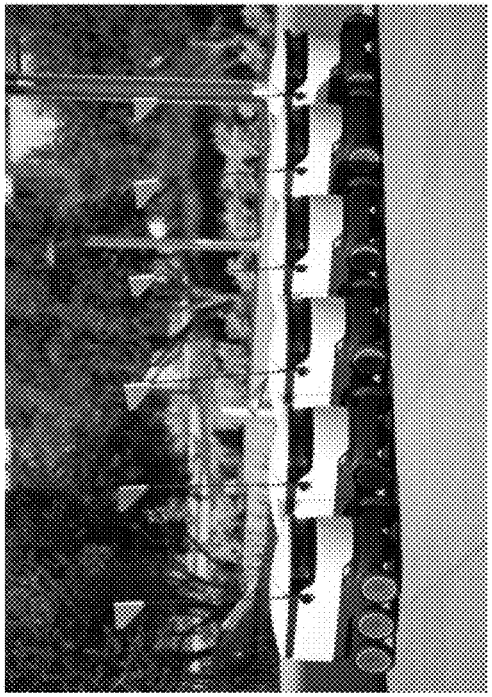
Figure 5A:
Figure 5A:
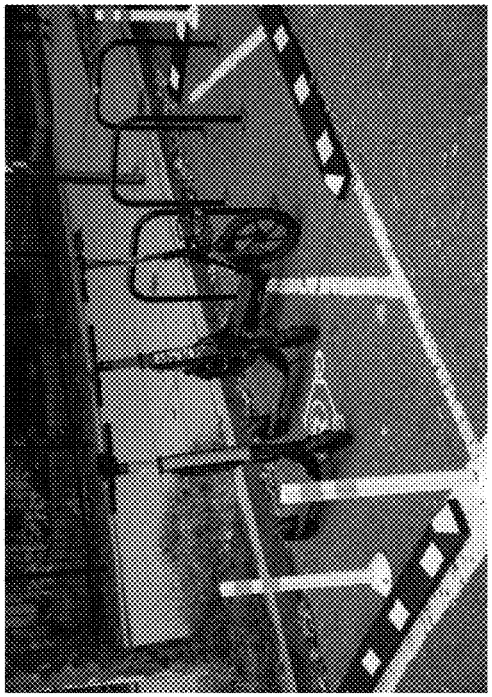

In one embodiment, in step 307, based on the determination, the output module 207 can output an indication of whether the candidate placement location in the sidewalk area is suitable for temporary placement of the shared micro-mobility vehicle. FIG. 5A are images of scenarios of properly placed shared micro-mobility vehicles, according to example embodiment(s). For instance, in an image 501, a shared micro-mobility vehicle is properly placed behind a post, without interfering with any bike lane, people flow, or parked car. In an image 503, four shared micro-mobility vehicles are properly lined up to save space, just next to a bike lane without direct risk to fall on the bike lane or interfering with people flows. In an image 505, three shared micro-mobility vehicles are generally lined up in a micro-mobility vehicle corral on a street shoulder. In an image 507, six smart deliver bots are properly lined up to save space, just in front of a grass land.

Figure 5B:
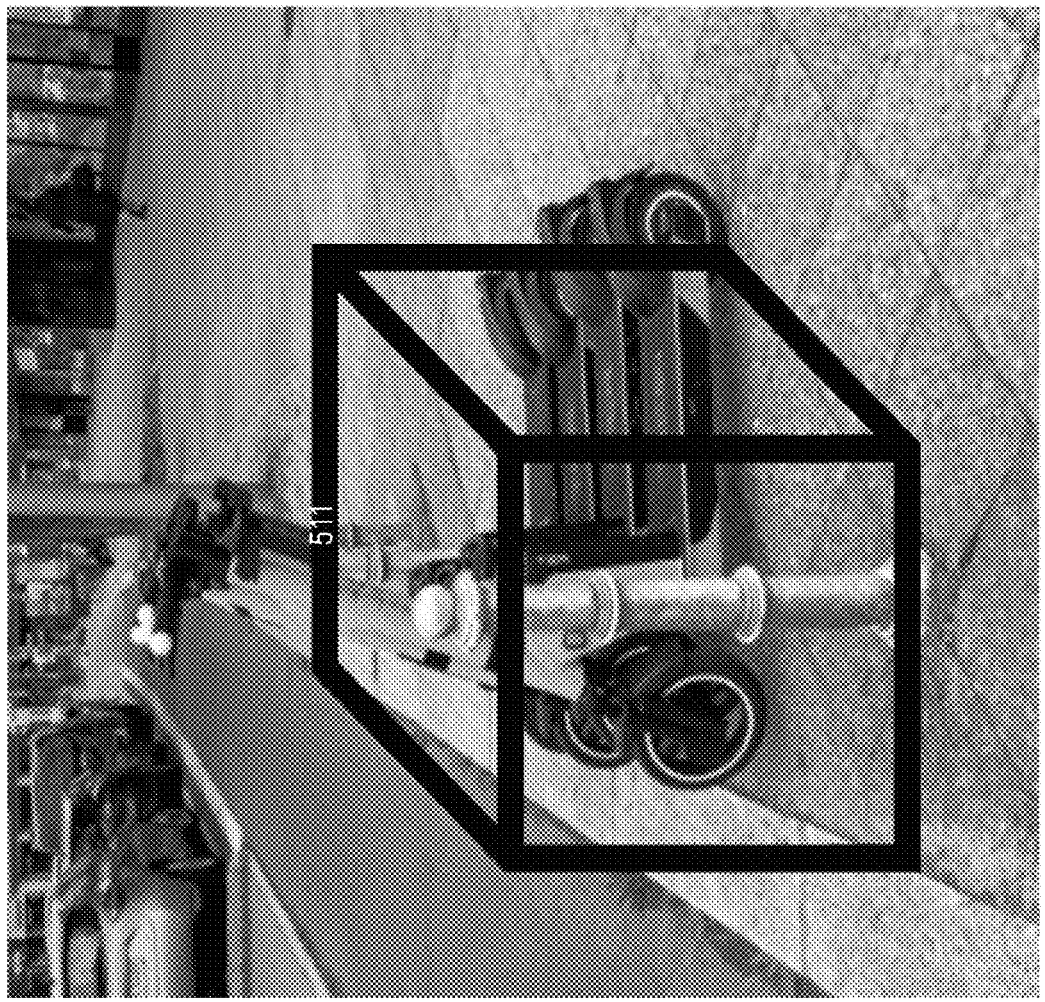
FIG. 5B is an image marked with an available space to place shared micro-mobility vehicles, according to example embodiment(s)

Taking the image 503 as an example, in one embodiment, the factor module 203 can process depth sensor data (e.g., the LiDAR sensor data) to calculate an available space 511 in-between the post after excluding the space occupied by the existing four shared micro-mobility vehicles. FIG. 5B is an image marked with an available space to place shared micro-mobility vehicles, according to example embodiment(s). Such available space 511 can be output for placing additional shared micro-mobility vehicle(s).

In one embodiment, the output module 207 can generate a user interface providing a representation of the indication, the current or predicted people flow, the candidate placement location, or a combination thereof. In another embodiment, outputting the indication comprises providing, via a user interface, a recommended placement location for the shared micro-mobility vehicle based on the determination. For instance, the user interface can be an augmented reality user interface. FIGS. 6A-6D are diagrams of example user interfaces associated with placing shared micro-mobility vehicle(s) in a public space, according to example embodiment(s).

Figure 6A:
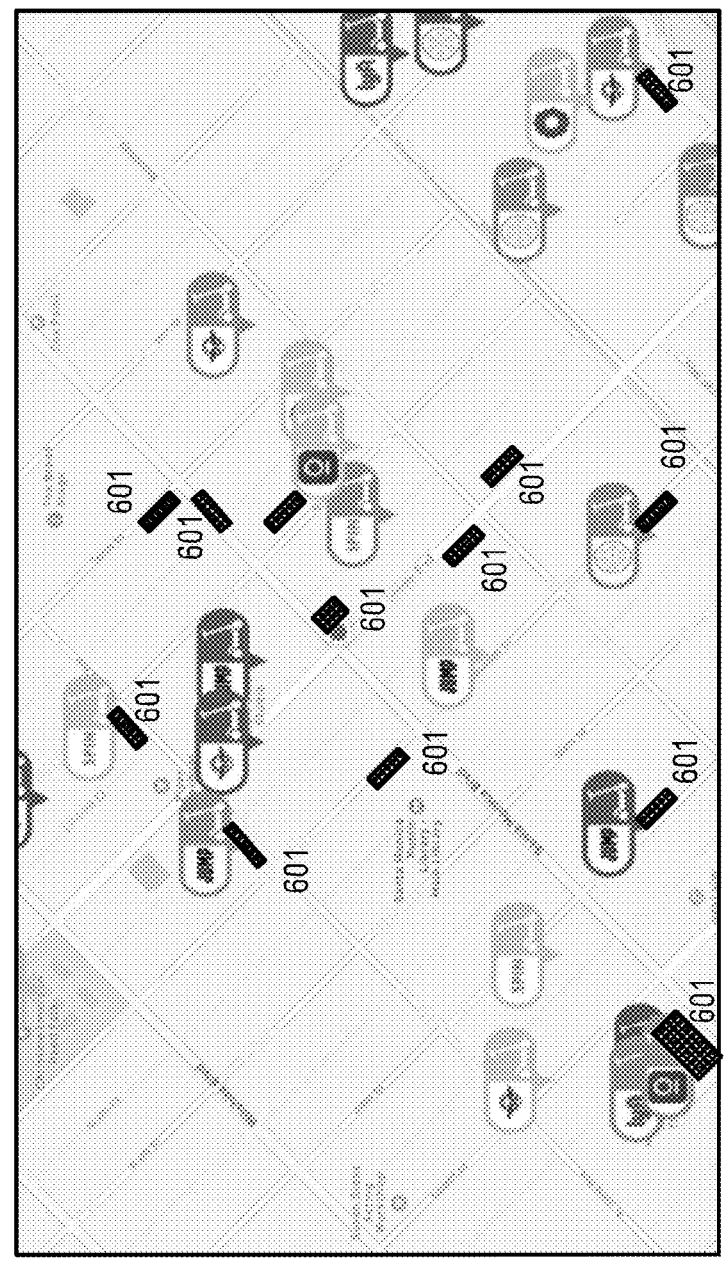
FIGS. 6A-6D are diagrams of example user interfaces associated with placing shared micro-mobility vehicle(s) in a public space, according to example embodiment(s)
Figure 6B:
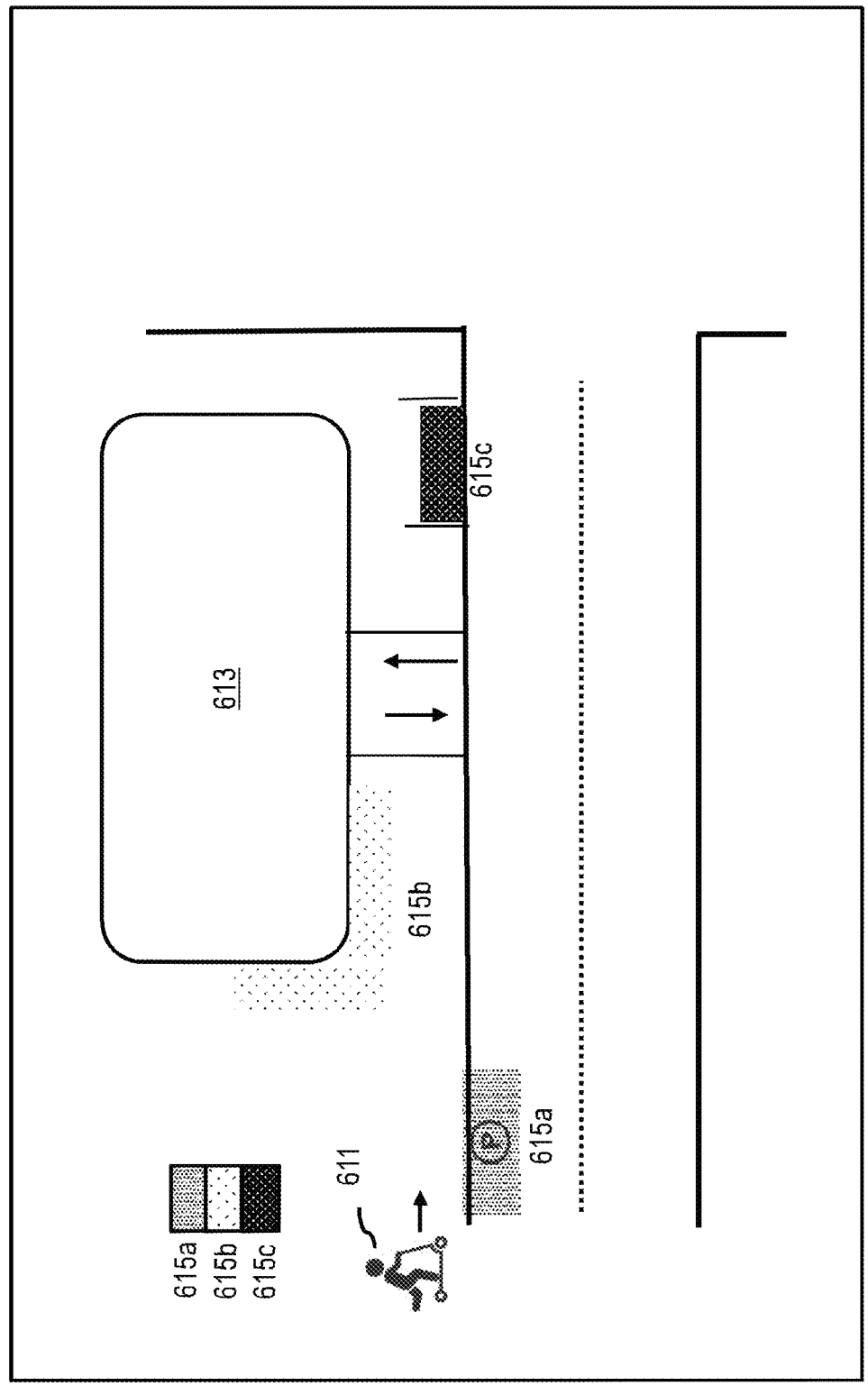

In one embodiment, outputting the indication comprises storing the shared vehicle placement score in a map layer of a geographic database (e.g., the geographic database 115). For instance, in FIG. 6A, candidate placement locations 601 (e.g., as black rectangles) are made into a map layer overlaid on a map 600 that also shows available shared micro-mobility vehicles with operator symbols. In FIG. 6B, a navigation user interface 610 is provided to guide a user to place an e-scooter 611 near a destination 613 (e.g., a subway station). The candidate placement locations 615 include a micro-mobility vehicle corral 615a (e.g., the micro-mobility vehicle corral in the image 505), a corner of the station 615b, and an area 615c sheltered between two posts. The micro-mobility vehicle corral 615a is safest but further away from the subway entrance. The corner of the station 615b is close to the station entrance but easier being knocked down to interfere with the people flow. The area 615c is not the closest to the station entrance yet sheltered between two posts. The system 100 may rank these candidate placement locations based on preferences of the system 100, the operators, and/or the users, and then recommend to the users accordingly.

Figure 6C:
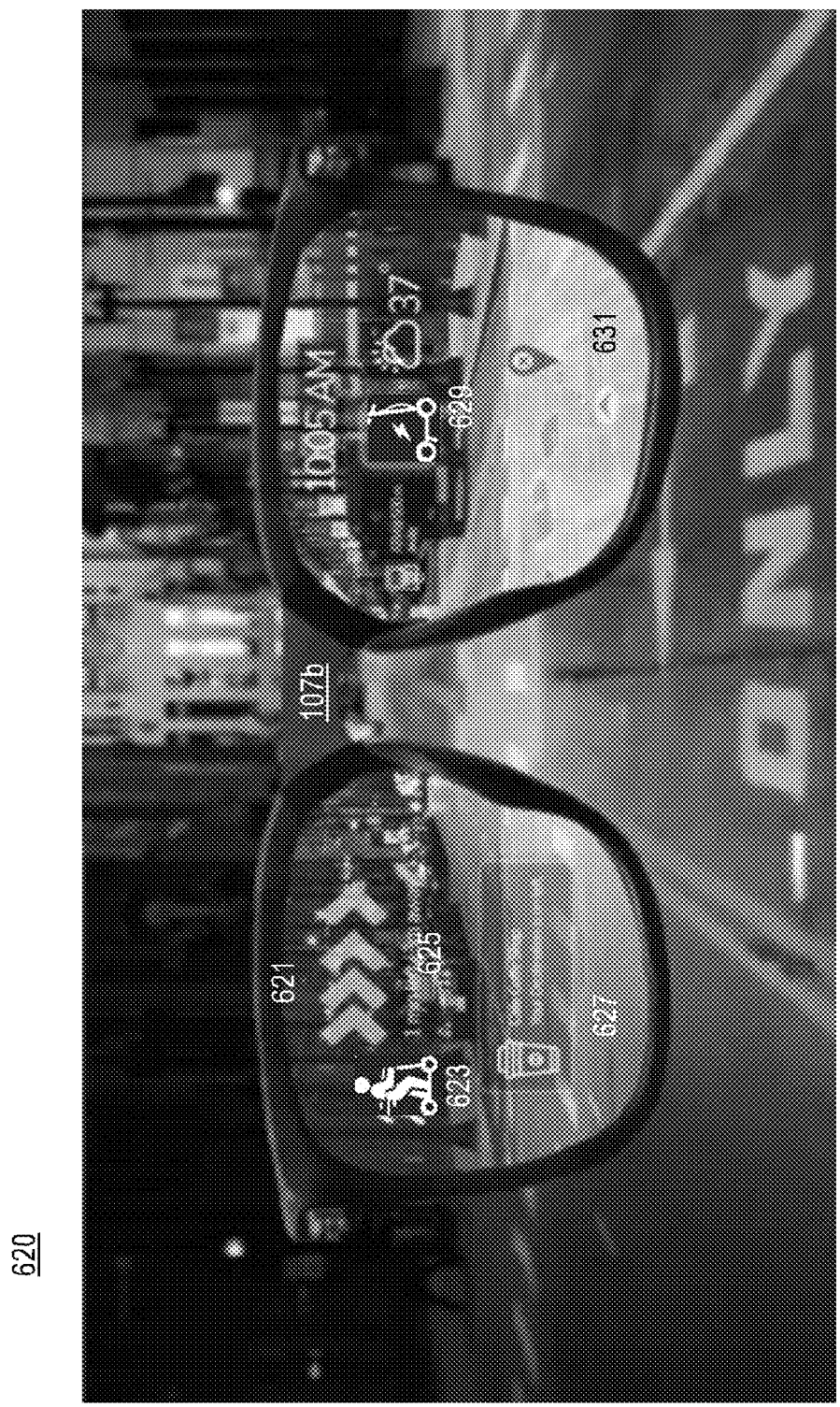
Figure 6D:
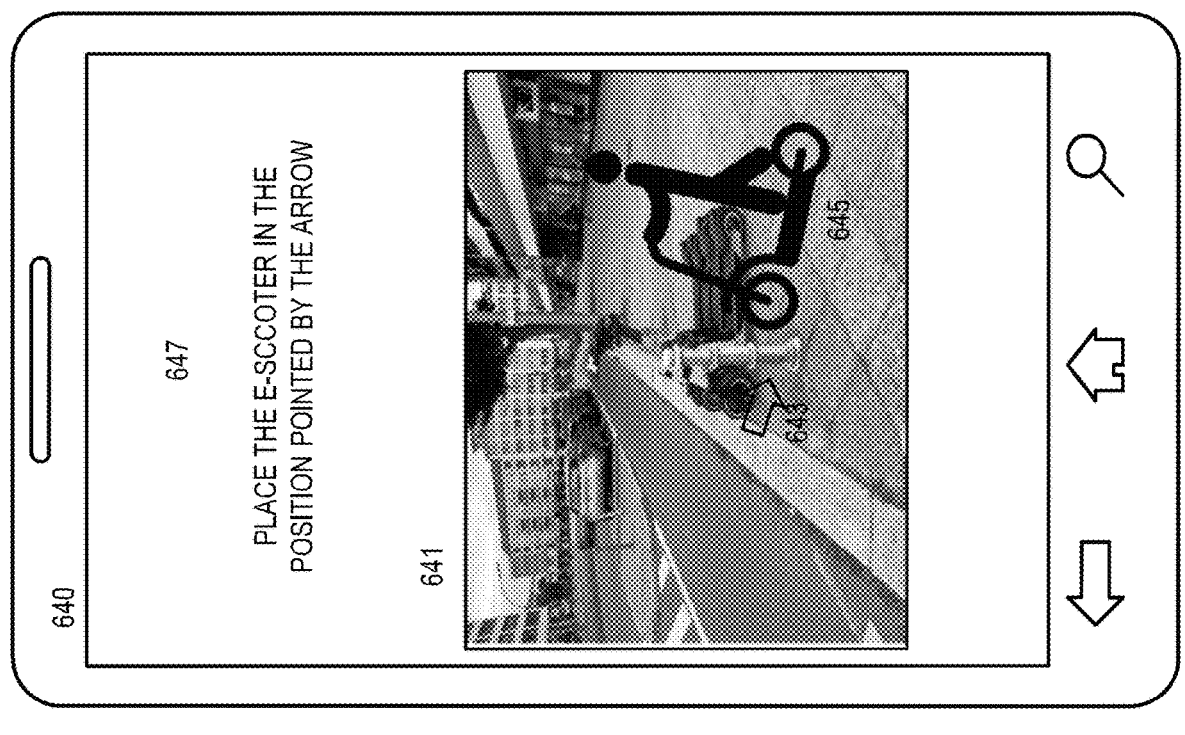

After the user selects a candidate placement location (e.g., near a coffee shop), the system 100 can display a user interface (UI) 621 on a UE (e.g., the smart glass 109b) in FIG. 6C to guide the user to the selected placement location as shown in an image 620. In this case, the left side of the UI 621 includes an icon 623 of a user riding on an e-scooter, a direction arrow 625, and a POI description box 627 pf the coffee shop. The right side of the UI 621 includes an e-scooter charging station icon 629, a 2D map 631 marked with the e-scooter charging station, a current time, a current temperature, and a current weather icon. When the user arrives at the selected placement location, the system 100 can display a user interface (UI) 640 on a UE (e.g., the smart phone 109a) in FIG. 6D to guide the user to place the e-scooter in the selected placement location as shown in an image 641. In this case, the image 641 shows an arrow 643 and an icon 645 of a user riding on an e-scooter. The UI 640 also shows an alert 647: "Place the e-scooter in the position pointed by the arrow." The alert 647 of other alert (e.g., "place one meter left") can be delivered via an audio interface.

In one embodiment, location-based services and/or applications (e.g., provided by the services platform 121, services 123, and/or content providers 125) can use the indication and/or the shared vehicle placement score to provide various functions. For example, mapping and/or navigation applications can perform functions including but not limited to: (1) displaying such information on the map to encourage proper shared micro-mobility vehicle placement; (2) routing users away from the people flow; (3) adapt guidance related information; (4) alerting public forces (e.g., police) to be present at the popular yet illegal placement locations (e.g., to fine placing on bicycle lanes); (5) simulate areas for urban planners using such collected data, and/or the like.

In one embodiment, the system 100 can use the occupied placement locations to interrupt and purposefully direct people to POIs, etc. for urban planning, such as surrounding a park grass land with parked e-bikes to deter people from walking over green grass.

Returning to FIG. 1, the system 100 includes the mapping platform 105 for performing the processes for determining placement location(s) in a public space for a shared micro-mobility vehicle according to the various embodiments described herein. As shown, the mapping platform 105 has connectivity to a parking data infrastructure comprising placement sensors (e.g., in-ground placing sensors or equivalent) embedded in the public space, and the vehicles 101 and/or UE 109 for collecting probe data or location traces from which location data can also be determined. In one embodiment, each vehicle 101 can be equipped with sensors (e.g., location sensors) that can also detect when the micro-mobility vehicle 101 parks in or leaves a placement location, for storage or transmission as vehicle location data and/or placement location availability data.

In one embodiment, the micro-mobility vehicles 101 and/or one or more UEs 109 associated with a micro-mobility vehicle 101 can act as probes traveling over a public space (e.g., the sidewalk area 103) represented in the geographic database 115. The UE 109 can be associated with any of the types of micro-mobility vehicles 101 or a user or thing traveling through the public space. For example, the UE 109 can be a standalone device (e.g., mobile phone, portable navigation device, wearable device, etc.) or installed/embedded in the micro-mobility vehicle 101. In one embodiment, the micro-mobility vehicle 101 and/or UE 109 may be configured with one or more sensors (such as sensors 111) for determining placement data. By way of example, the sensors 111 may include location sensors (e.g., GPS), accelerometers, compass sensors, gyroscopes, altimeters, etc. In one embodiment, the sensors 111 can also be used to detect and report status data about an operational state of the micro-mobility vehicle 101 to assist in determining when the micro-mobility vehicle 101 parks in or leaves a location in the sidewalk area 103. For example, a placement event may be detected when it is determined that a vehicle's is power off, locked, and/or the like. In one embodiment, the micro-mobility vehicle 101 and/or UE 109 are assigned unique probe identifiers (probe ID) for use in reporting or transmitting collected probe data for determining people flow and/or vehicle placement event data. The micro-mobility vehicle 101 and UE 109, for instance, are part of a probe-based system for collecting probe data for determining placement location(s) in a public space for a shared micro-mobility vehicle according to the various embodiments described herein.

In one embodiment, when a micro-mobility vehicle 101 and/or UE 109 (e.g., via a navigation system, mapping application 113, and/or the like) requests instructions to find placement location(s) in a given area, the mapping platform 105 can use the indication and/or the shared vehicle placement score to form a map layer. The mapping platform 105 can then provide the map layer to the micro-mobility vehicle 101 and/or the UE 109 for presentation in a mapping or navigation user interface. For example, the placement location data can provide a better estimated time of arrival (ETA) and/or estimated time of delivery (ETD) to a given POI depending on the factors.

In one embodiment, as noted above, the micro-mobility vehicles 101 are equipped with an embedded navigation systems or other navigation devices (e.g., a UE 109) that are capable of submitting requests for placement location information (e.g., the indication and/or the scores, etc.), and of guiding a user of the micro-mobility vehicle 101 to a selected placement location. In one embodiment, as the user navigates to the selected placement location, the micro-mobility vehicles 101 and/or UE 109 (e.g., via the mapping application 113) may receive real-time updates on the route and/or the selected placement location.

In one embodiment, requests for placement location information can be triggered by interactions with a user interface of the micro-mobility vehicle 101 and/or UE 109 (e.g., an explicit request from a user or rider), or automatically when the user or vehicle 101 approaches a target destination (e.g., a set destination, an inferred destination, and/or any other known destination). In yet another embodiment, the micro-mobility vehicle 101 and/or UE 109 can initiate a request for placement location data for points of interest when the micro-mobility vehicle 101 is detected to have initiated a placement location search (e.g., by creating location traces or trajectory data indicating slowing down, multiple U-turns, etc. within an area of the destination). In this way, the placement location data can be provided even when no destination is set or known by the system 100.

In yet another embodiment, the placement location data generated for each new or updated area can be used to build or update the shared vehicle placement score model and/or the geographic database 115. Calculating shared vehicle placement score data can be resource intensive. As a result, many factor records for public spaces stored in the shared vehicle placement score model do not need to be populated. Rather, the system 100 can use the shared vehicle placement score model to estimate shared vehicle placement scores for a public space without having to use the above-discussed embodiments (e.g., analysis probe data to determine people flow data, calculating shared vehicle placement scores based factor data, etc.).

In one embodiment, a machine learning data matrix/table of the shared vehicle placement score model can include a current or predicted people flow, a bicycle lane, presence of one or more objects, a point of interest, a vehicle parking area, a transit station, a sidewalk configuration, etc. By way of example, the matrix/table can list relationships among the factors and training data. For instance, notation pf Ai can indicate the ith set of people flow features, ⟦ bf ⟧ ^i can indicate the ith set of bike lane features, of ⟦ of ⟧ ^i can indicate the ith set of object features, ⟦ poif ⟧ ^i can indicate the ith set of POI features, ⟦ vpf ⟧ ^i can indicate the ith set of vehicle parking features, ⟦ tsf ⟧ ^i can indicate the ith set of transit station features, ⟦ swf ⟧ ^i can indicate the ith set of sidewalk configuration features, etc.

For instance, people flow attributes/features can include light, medium, heavy, packed, etc., bike lane features can include configurations, pavement surface material, etc., object features can include shape, dimensions, materials, etc., POI features can include types, operation hours, occupancy, entry/exit/loading locations, etc., vehicle parking features can include parking space size, restrictions, etc., transit station features can include user flow, operation hours, etc., sidewalk configuration features can include sidewalk dimensions, etc.

In other embodiments, the shared vehicle placement score model further consider public space attributes/features (e.g., dimensions, shapes, directionality, traffic of path links nearby, etc.), public space usage attributes/features (e.g., people flow data, designated or not, paved or not, usage restrictions (e.g., temporary event limits including street fairs, festival, etc.), fee or free, churn rates, occupancy/usage patterns, etc.), micro-mobility vehicle attributes/features (e.g., type, model, weight, size, maneuverability, origin/destination, mobility graphs, etc.), user attributes/features (e.g., user demographic data, preference data, with special needs or not, etc.), delivery attributes/features (e.g., weights, sizes, pickup/drop-off locations of packages to be delivered, etc.), traffic attributes/features (e.g., light, medium, heavy, blocked, etc.), weather attributes/features (e.g., rain, snow, etc.), etc.

In one embodiment, the training data can include ground truth data taken from historical data. For instance, in a data mining process, factor features are mapped to ground truth map objects/features to form a training instance. A plurality of training instances can form the training data for the shared vehicle placement score model using one or more machine learning algorithms, such as random forest, decision trees, etc. For instance, the training data can be split into a training set and a test set, e.g., at a ratio of 60%:40%. After evaluating several machine learning models based on the training set and the test set, the machine learning model that produces the highest classification accuracy in training and testing can be used (e.g., by the machine learning system 117) as the shared vehicle placement score model. In addition, feature selection techniques, such as chi-squared statistic, information gain, gini index, etc., can be used to determine the highest ranked factor features from the set based on the feature's contribution to shared vehicle placement effectiveness.

In other embodiments, ground truth mobility data can be more specialized than what is prescribed in the matrix/table. For instance, the ground truth could be specific to e-scooters placed in a plaza. In the absence of one or more sets of the factor features, the model can still function using the available features.

In one embodiment, the shared vehicle placement score model can learn from one or more feedback loops based on, for example, shared micro-mobility vehicle behavior data and/or feedback data (e.g., from users), via analyzing and reflecting the actual placement data, etc.

In other embodiments, the machine learning system 117 can train the shared vehicle placement score model to select or assign respective weights, correlations, relationships, probabilities, etc. among the factor features, to provide shared vehicle placement scores and add new factors/features into the model. In one instance, the machine learning system 117 can continuously provide and/or update the machine learning models (e.g., a support vector machine (SVM), neural network, decision tree, etc.) of the machine learning system 117 during training using, for instance, supervised deep convolution networks or equivalents. In other words, the machine learning system 117 trains the machine learning models using the respective weights of the factor features to most efficiently select optimal shared vehicle placement locations in public spaces.

In another embodiment, the machine learning system 117 of the mapping platform 105 includes a neural network or other machine learning system(s) to update enhanced factor features in different public spaces. In one embodiment, the neural network of the machine learning system 117 is a traditional convolutional neural network which consists of multiple layers of collections of one or more neurons (which are configured to process a portion of an input data). In one embodiment, the machine learning system 117 also has connectivity or access over a communication network 119 to the geographic database 115 that can each store map data, the factor feature data, the output data, etc.

The above-discussed embodiments can be applied to increase shared micro-mobility vehicle placement efficiency and/or travel safety in any public spaces.

In one embodiment, the micro-mobility vehicle 101 and/or UE 109 are configured to report probe data as probe points, which are individual data records that record telemetry data collected at a point in time. In one embodiment, a probe point can include attributes such as a heading, a speed, a time, or a combination thereof of each of the plurality of devices. At least some of these attributes can also be used as classification features. It is contemplated that any combination of these attributes or other attributes may be recorded as a probe point. As previously discussed, the micro-mobility vehicle 101 may include sensors for reporting measurements and/or reporting attributes. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior.

In one embodiment, the mapping platform 105, the micro-mobility vehicles 101, and/or the UE 109 can interact with a service platform 121, one or more services 123*a*-123*j* (also collectively referred to as services 123), one or more content providers 125*a*-125*k* (also collectively referred to as content providers 125), or a combination thereof over communication network 119 to provide functions and/or services based on the shared vehicle placement score model created according to the various embodiments described herein. The service platform 121, services 123, and/or content providers 125 may provide mapping, navigation, and/or other location based services to the micro-mobility vehicle 101 and/or UE 109.

By way of example, the UE 109 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the mapping platform 105 may be implemented as a cloud based service, hosted solution or the like for performing the above described functions. Alternatively, the mapping platform 105 may be directly integrated for processing data generated and/or provided by the service platform 121, services 123, content providers 125, and/or applications 113. Per this integration, the mapping platform 105 may perform client-side shared vehicle placement score model building based on historical parking event data.

By way of example, the communication network 119 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the mapping platform 105 communicates with other components of the system 100 using well known, new or still developing protocols. In this context, a protocol includes a set of rules defining how the network nodes within the communication network 119 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

The processes described herein for determining placement location(s) in a public space for a shared micromobility vehicle may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
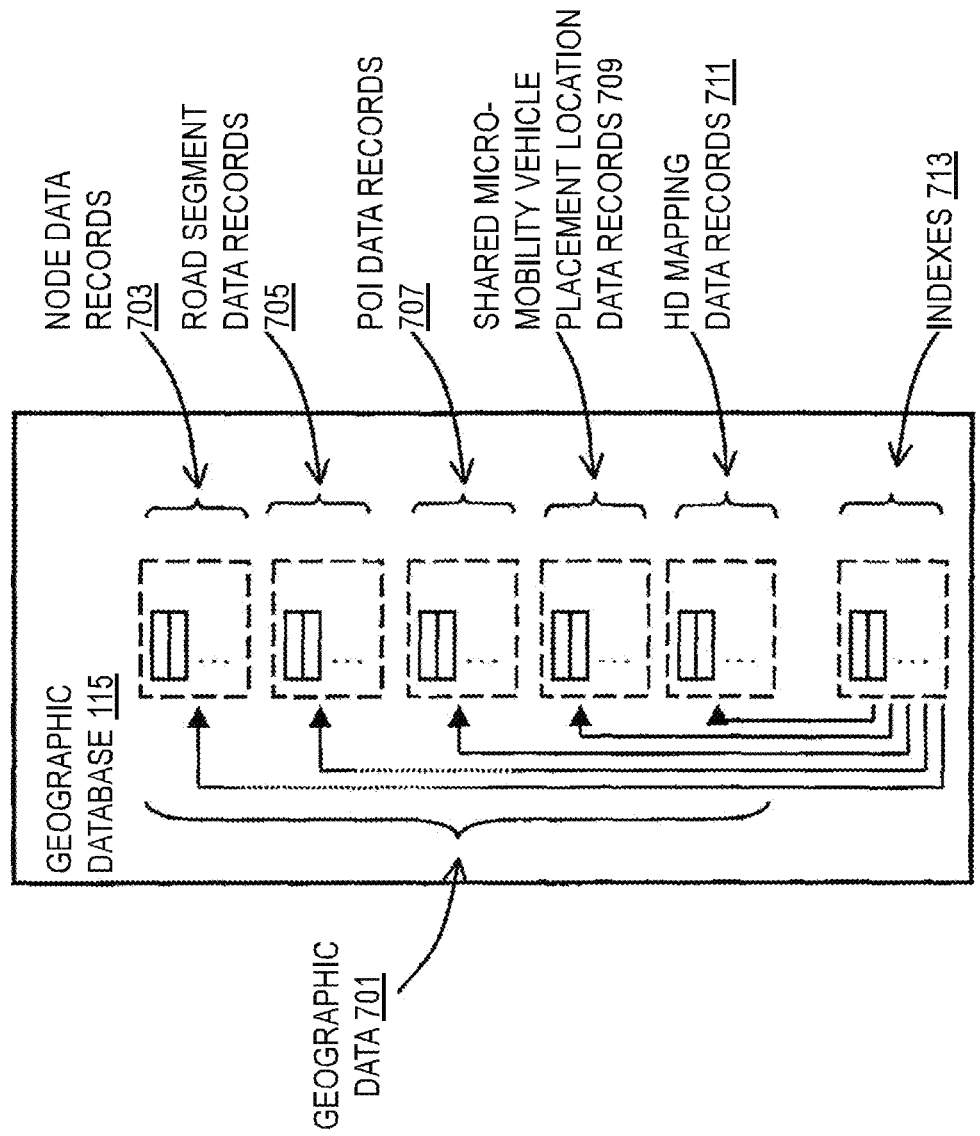
FIG. 7 is a diagram of a geographic database, according to example embodiment(s)

FIG. 7 is a diagram of a geographic database (such as the database 115), according to one embodiment. In one embodiment, the geographic database 115 includes geographic data 701 used for (or configured to be compiled to be used for) mapping and/or navigation-related services, such as for video odometry based on the parametric representation of lanes include, e.g., encoding and/or decoding parametric representations into lane lines. In one embodiment, the geographic database 115 include high resolution or high definition (HD) mapping data that provide centimeter-level or better accuracy of map features. For example, the geographic database 115 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 711) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 115.

"Node"— A point that terminates a link.

"Line segment"— A straight line connecting two points.

"Link" (or "edge")— A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 115 follows certain conventions. For example, links do not cross themselves and do not cross each other except at a node. Also, there are no duplicated shape points, nodes, or links. Two links that connect each other have a common node. In the geographic database 115, overlapping geographic features are represented by overlapping polygons. When polygons overlap, the boundary of one polygon crosses the boundary of the other polygon. In the geographic database 115, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 115 includes node data records 703, road segment or link data records 705, POI data records 707, shared micro-mobility vehicle placement location data records 709, mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 115. In one embodiment, the indexes 713 may be used to quickly locate data without having to search every row in the geographic database 115 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points (such as intersections) corresponding to the respective links or segments of the road segment data records 705. The road link data records 705 and the node data records 703 represent a road network, such as used by vehicles, cars, and/or other entities. Alternatively, the geographic database 115 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 115 can include data about the POIs and their respective locations in the POI data records 707. The geographic database 115 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city). In one embodiment, certain attributes, such as lane marking data records, mapping data records and/or other attributes can be features or layers associated with the link-node structure of the database.

In one embodiment, the geographic database 115 can also include shared micro-mobility vehicle placement location data records 709 for storing factor data, factor feature data, indication data, shared vehicle placement score data, shared vehicle placement instance data, training data, prediction models, annotated observations, computed featured distributions, sampling probabilities, and/or any other data generated or used by the system 100 according to the various embodiments described herein. By way of example, the shared micro-mobility vehicle placement location data records 709 can be associated with one or more of the node records 703, road segment records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the mapping data records 711 model road surfaces and other map features to centimeter-level or better accuracy. The mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 711 are divided into spatial partitions of varying sizes to provide mapping data to micro-mobility vehicles 101 and other end user devices with near real-time speed without overloading the available resources of the micro-mobility vehicles 101 and/or devices (e.g., computational, memory, bandwidth, etc. resources).

In one embodiment, the mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 711.

In one embodiment, the mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 115 can be maintained by the content provider 125 in association with the services platform 121 (e.g., a map developer). The map developer can collect geographic data to generate and enhance the geographic database 115. There can be different ways used by the map developer to collect data. These ways can include obtaining data from other sources, such as municipalities or respective geographic authorities. In addition, the map developer can employ field personnel to travel by vehicle (e.g., vehicles 101) along roads throughout the geographic region to observe features and/or record information about them, for example. Also, remote sensing, such as aerial or satellite photography, can be used.

The geographic database 115 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as in a vehicle 101 or a UE 109, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining placement location(s) in a public space for a shared micro-mobility vehicle may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
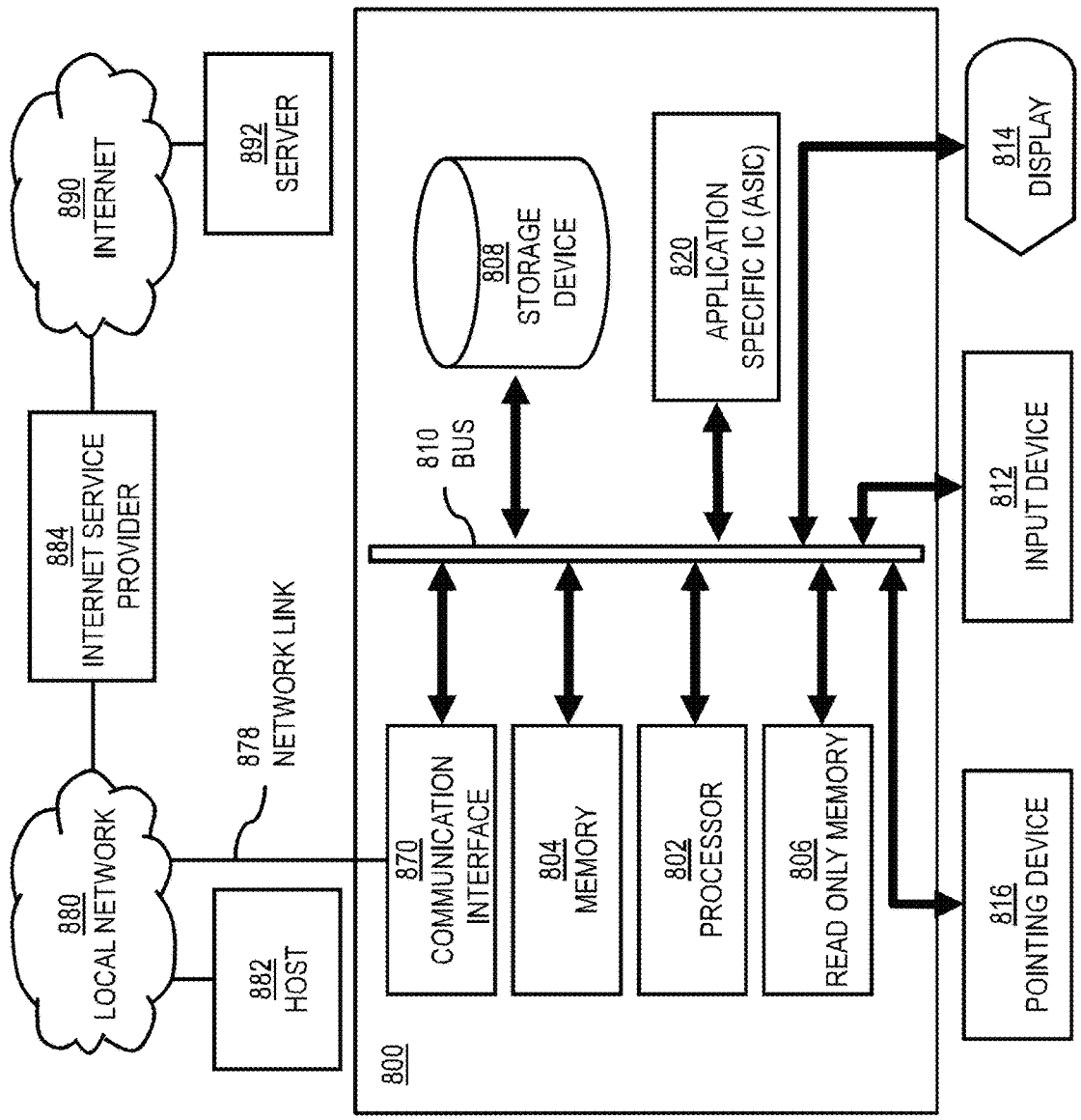
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to determine placement location(s) in a public space for a shared micro-mobility vehicle as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to determining placement location(s) in a public space for a shared micro-mobility vehicle. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RANI) or other dynamic storage device, stores information including processor instructions for determining placement location(s) in a public space for a shared micro-mobility vehicle. Dynamic memory allows information stored therein to be changed by the computer system 800. RANI allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining placement location(s) in a public space for a shared micro-mobility vehicle, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 119 for determining placement location(s) in a public space for a shared micro-mobility vehicle.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system can be deployed in various configurations within other computer systems, e.g., host 882 and server 892.

FIG. 9 illustrates a chip set 900 upon which an embodiment of the invention may be implemented. Chip set 900 is programmed to determine placement location(s) in a public space for a shared micro-mobility vehicle as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine placement location(s) in a public space for a shared micro-mobility vehicle. The memory 905 also stores the data associated with or generated by the execution of the inventive steps.

Figure 10:
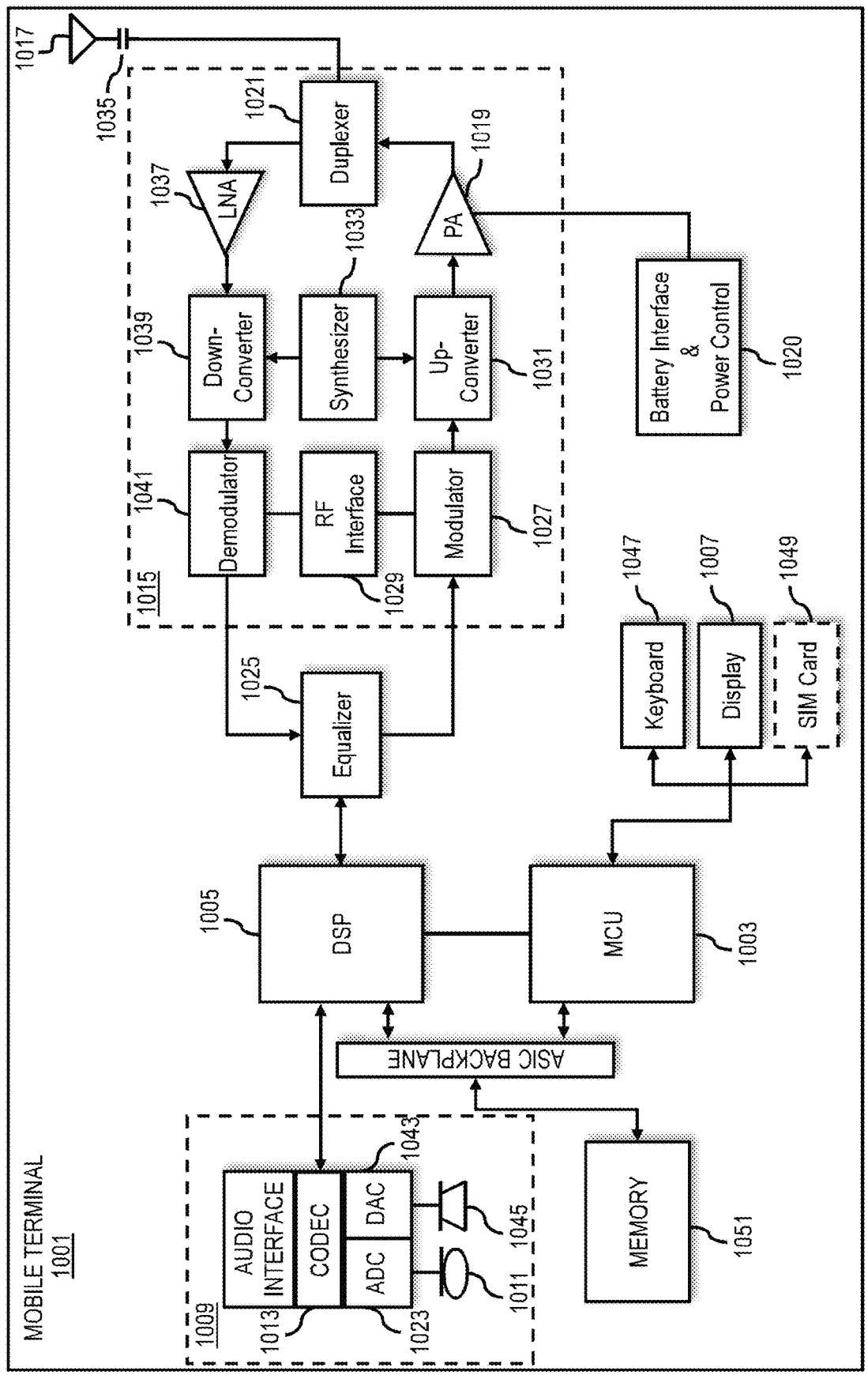
FIG. 10 is a diagram of a mobile terminal (e.g., mobile computer or vehicle or part thereof) that can be used to implement an embodiment.

FIG. 10 is a diagram of exemplary components of a mobile terminal 1001 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to determine placement location(s) in a public space for a shared micro-mobility vehicle. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining one or more placement locations on a sidewalk area that are suitable for temporary placement of a shared micro-mobility vehicle, the method comprising:
   identifying, by one or more processors, a candidate placement location in the sidewalk area, the identification being prior to the temporary placement of the shared micro-mobility vehicle, wherein the candidate placement location is an available space in the sidewalk area to place the shared micro-mobility vehicle, and wherein the candidate placement location is determined by processing light detection and ranging (LIDAR) data, image data, or a combination thereof;
   determining, by the one or more processors, one or more factors associated with the candidate placement location and/or one or more nearby locations in the sidewalk area, wherein the one or more factors comprise one or more of: a current or predicted people flow, a bicycle lane, presence of one or more objects, a point of interest, a vehicle parking area, a transit station, or a sidewalk configuration;
   making a determination, by the one or more processors, of whether the candidate placement location in the sidewalk area is suitable for temporary placement of the shared micro-mobility vehicle based on whether the candidate placement location enables one or more of following:
   (i) avoiding interference between the shared micro-mobility vehicle and (a) the current or predicted people flow, (b) the bicycle lane, and/or (c) the one or more objects,
   (ii) preventing the shared micro-mobility vehicle from hindering usage of (a) the point of interest, (b) the vehicle parking area, and/or (c) the transit station, or
   (iii) accommodating the shared micro-mobility vehicle to the sidewalk configuration; and
   based on the determination, outputting, by the one or more processors, an indication of whether the candidate placement location in the sidewalk area is suitable for temporary placement of the shared micro-mobility vehicle.

2. The method of claim 1, further comprising:
processing the LIDAR data, the image data, or a combination thereof to determine the sidewalk area, the one or more factors, or a combination thereof.

3. The method of claim 1, further comprising:
processing the LIDAR data using image segmentation to determine the sidewalk area, the candidate placement location, the one or more factors, or a combination thereof,
wherein the indication is determined in real-time or substantially real-time based on the LIDAR data.

4. The method of claim 1, further comprising:
processing map data to determine the sidewalk area, the candidate placement location, the bicycle lane, the point of interest, the vehicle parking area, the transit station, the sidewalk configuration, or a combination thereof.

5. The method of claim 1, further comprising:
processing map data to determine the bicycle lane, the point of interest, the vehicle parking area, the transit station, the sidewalk configuration, or a combination thereof,
wherein the current or predicted people flow is estimated based on the bicycle lane, the point of interest, the vehicle parking area, the transit station, the sidewalk configuration, or a combination thereof.

6. The method of claim 1, wherein the current or predicted people flow is determined based on people probe data collected from the sidewalk area.

7. The method of claim 1, further comprising:
determining physical dimensions of the sidewalk area, the candidate placement location, or a combination thereof available to support the placing of the shared micro-mobility vehicle based on the current or predicted people flow.

8. The method of claim 1, wherein making the determination comprises determining a shared vehicle placement score indicating how suitable the candidate placement location is for temporary placement of the shared micro-mobility vehicle in the sidewalk area based on one or more additional factors.

9. The method of claim 8, wherein the one or more additional factors include a temporal parameter, a weather parameter, an event parameter, or a combination thereof.

10. The method of the claim 9, wherein outputting the indication comprises storing the shared vehicle placement score in a map layer of a geographic database.

11. The method of claim 1, further comprising:
determining a probability that the shared micro-mobility vehicle may fall into a pedestrian path, a bicycle lane, or a combination thereof based on the current or predicted people flow,
wherein the indication is further based on the probability.

12. The method of claim 1, further comprising:
generating a user interface providing a representation of the indication, the current or predicted people flow, the candidate placement location, or a combination thereof.

13. The method of claim 1,
wherein outputting the indication comprises providing, via a user interface, a recommended placement location for the shared micro-mobility vehicle based on the determination.

14. The method of claim 13, wherein the user interface is an augmented reality user interface.

15. An apparatus for determining a placement location in a public space that is suitable for temporary placement of a shared micro-mobility vehicle, comprising:
at least one processor; and
at least one memory including computer program code for one or more programs, the at least one memory and the computer program code configured to, with the at least one processor, cause the apparatus to perform at least the following,
determine one or more factors associated with the candidate placement location and/or one or more nearby locations in the public space, the determination being prior to the temporary placement of the shared micro-mobility vehicle, wherein the one or more factors comprise one or more of: a current or predicted people flow, a bicycle lane, presence of one or more objects, a point of interest, a vehicle parking area, a transit station, or a public space configuration;
make a determination of whether the candidate placement location in the public space is suitable for temporary placement of the shared micro-mobility vehicle based on whether the candidate placement location enables one or more of following:
(i) avoiding interference between the shared micro-mobility vehicle and (a) the current or predicted people flow, (b) the bicycle lane, and/or (c) the one or more objects,
(ii) preventing the shared micro-mobility vehicle from hindering usage of (a) the point of interest, (b) the vehicle parking area, and/or (c) the transit station, or
(iii) accommodating the shared micro-mobility vehicle to the public space configuration; and
based on the determination, output an indication of whether the candidate placement location in the geographic area is suitable for temporary placement of the shared micro-mobility vehicle.

16. The apparatus of claim 15, wherein the apparatus is further caused to:
process the LIDAR data, the image data, or a combination thereof to determine the geographic area, the one or more factors, or a combination thereof,
wherein the public space is a sidewalk, square, plaza, playground, or park.

17. The apparatus of claim 15, wherein the apparatus is further caused to:
process the LIDAR data using image segmentation to determine the public space, the candidate placement location, the one or more factors, or a combination thereof,
wherein the indication is determined in real-time or substantially real-time based on the LIDAR data.

18. A non-transitory computer-readable storage medium for determining a placement location on a sidewalk area that is suitable for temporary placement of a shared micro-mobility vehicle, carrying one or more sequences of one or more instructions which, when executed by one or more processors, cause an apparatus to perform:
determining one or more factors associated with the candidate placement location and/or one or more nearby locations in the sidewalk area, the determination being prior to the temporary placement of the shared micro-mobility vehicle, wherein the one or more factors comprise one or more of: a current or predicted people flow, a bicycle lane, presence of one or more objects, a point of interest, a vehicle parking area, a transit station, or a sidewalk configuration, and wherein the candidate placement location is determined by processing light detection and ranging (LIDAR) data, image data, or a combination thereof;

making a determination of whether the candidate placement location in the sidewalk area is suitable for temporary placement of the shared micro-mobility vehicle based on whether the candidate placement location enables one or more of following:
(i) avoiding interference between the shared micro-mobility vehicle and (a) the current or predicted people flow, (b) the bicycle lane, and/or (c) the one or more objects,
(ii) preventing the shared micro-mobility vehicle from hindering usage of (a) the point of interest, (b) the vehicle parking area, and/or (c) the transit station, or
(iii) accommodating the shared micro-mobility vehicle to the sidewalk configuration; and based on the determination, outputting an indication of whether the candidate placement location in the sidewalk area is suitable for temporary placement of the shared micro-mobility vehicle.

19. The non-transitory computer-readable storage medium of claim 18, wherein the apparatus is caused to further perform:

processing the LIDAR data, the image data, or a combination thereof to determine the sidewalk area, the one or more factors, or a combination thereof.

20. The non-transitory computer-readable storage medium of claim 18, wherein the apparatus is caused to further perform:

processing the LIDAR data using image segmentation to determine the sidewalk area, the candidate placement location, the one or more factors, or a combination thereof, wherein the indication is determined in real-time or substantially real-time based on the LIDAR data.

* * * * *